US011899723B2

(12) United States Patent
Swanson et al.

(10) Patent No.: US 11,899,723 B2
(45) Date of Patent: Feb. 13, 2024

(54) BUILDING DATA PLATFORM WITH CONTEXT BASED TWIN FUNCTION PROCESSING

(71) Applicant: Johnson Controls Tyco IP Holdings LLP, Milwaukee, WI (US)

(72) Inventors: Trent Mark Swanson, Wellington, FL (US); Richard J. Campero, Morgan Hill, CA (US); Justin J. Ploegert, Cudahy, WI (US); Dominick J. O'Dierno, Mt Pleasant, WI (US); Brian Scott Otto, Menomonee Falls, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 394 days.

(21) Appl. No.: 17/354,436

(22) Filed: Jun. 22, 2021

(65) Prior Publication Data

US 2022/0405327 A1 Dec. 22, 2022

(51) Int. Cl.
*G06F 9/54* (2006.01)
*G06F 16/903* (2019.01)
(Continued)

(52) U.S. Cl.
CPC ...... *G06F 16/90335* (2019.01); *G06F 9/5016* (2013.01); *G06F 9/5027* (2013.01); *G06F 16/9024* (2019.01)

(58) Field of Classification Search
CPC ........ G06F 9/50; G06F 9/5005; G06F 9/5011; G06F 9/5016; G06F 9/5022; G06F 9/542; G06F 16/1734
See application file for complete search history.

(56) References Cited

U.S. PATENT DOCUMENTS 5,301,109 A 4/1994 Landauer et al.
5,446,677 A 8/1995 Jensen et al.
(Continued)

FOREIGN PATENT DOCUMENTS

AU 2019226217 A1 11/2020
AU 2019226264 A1 11/2020
(Continued)

OTHER PUBLICATIONS

U.S. Appl. No. 17/566,029, Passivelogic, Inc.
(Continued)

*Primary Examiner* — Andy Ho
(74) *Attorney, Agent, or Firm* — Foley & Lardner LLP

(57) ABSTRACT

One implementation of the present disclosure is a building system of a building including one or more memory devices having instructions stored thereon, that, when executed by one or more processors, cause the one or more processors to receive a selection including a context and a twin function and generate an operation to monitor a building graph based on the context, the operation identifying whether one or more new events are added to the building graph, the one or more new events affecting a processing result. The instructions cause the one or more processors to cause the twin function to execute responsive to identifying the one or more new events added to the building graph that affect the processing result, execute the twin function based on the one or more new events and the context to generate the processing result.

20 Claims, 13 Drawing Sheets

(51) Int. Cl.

| | |
|---|---|
| ***G06F 9/50*** | (2006.01) |
| ***G06F 16/901*** | (2019.01) |

(56) References Cited

U.S. PATENT DOCUMENTS

| | | | |
|---|---|---|---|
| 5,581,478 | A | 12/1996 | Cruse et al. |
| 5,812,962 | A | 9/1998 | Kovac |
| 5,960,381 | A | 9/1999 | Singers et al. |
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,229,470 | B1 | 7/2012 | Ranjan et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,753,455 | B2 | 9/2017 | Drees |
| 9,811,249 | B2 | 11/2017 | Chen et al. |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,169,454 | B2 | 1/2019 | Ait-Mokhtar et al. |
| 10,171,297 | B2 | 1/2019 | Stewart et al. |
| 10,171,586 | B2 | 1/2019 | Shaashua et al. |
| 10,187,258 | B2 | 1/2019 | Nagesh et al. |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,564,993 | B2 | 2/2020 | Deutsch et al. |
| 10,705,492 | B2 | 7/2020 | Harvey |
| 10,708,078 | B2 | 7/2020 | Harvey |
| 10,760,815 | B2 | 9/2020 | Janakiraman et al. |
| 10,762,475 | B2 | 9/2020 | Song et al. |
| 10,824,120 | B2 | 11/2020 | Ahmed |
| 10,845,771 | B2 | 11/2020 | Harvey |
| 10,854,194 | B2 | 12/2020 | Park et al. |
| 10,862,928 | B1 | 12/2020 | Badawy et al. |
| 10,921,760 | B2 | 2/2021 | Harvey |
| 10,921,972 | B2 | 2/2021 | Park et al. |
| 10,969,133 | B2 | 4/2021 | Harvey |
| 10,986,121 | B2 | 4/2021 | Stockdale et al. |
| 11,016,998 | B2 | 5/2021 | Park et al. |
| 11,024,292 | B2 | 6/2021 | Park et al. |
| 11,038,709 | B2 | 6/2021 | Park et al. |
| 11,041,650 | B2 | 6/2021 | Li et al. |
| 11,054,796 | B2 | 7/2021 | Holaso |
| 11,070,390 | B2 | 7/2021 | Park et al. |
| 11,073,976 | B2 | 7/2021 | Park et al. |
| 11,108,587 | B2 | 8/2021 | Park et al. |
| 11,113,295 | B2 | 9/2021 | Park et al. |
| 11,229,138 | B1 | 1/2022 | Harvey et al. |
| 11,314,726 | B2 | 4/2022 | Park et al. |
| 11,314,788 | B2 | 4/2022 | Park et al. |
| 11,556,105 | B2 | 1/2023 | Cooley et al. |
| 11,561,522 | B2 | 1/2023 | Cooley et al. |
| 11,561,523 | B2 | 1/2023 | Cooley et al. |
| 11,573,551 | B2 | 2/2023 | Cooley et al. |
| 11,586,167 | B2 | 2/2023 | Cooley et al. |
| 2002/0010562 | A1 | 1/2002 | Schleiss et al. |
| 2002/0016639 | A1 | 2/2002 | Smith et al. |
| 2002/0059229 | A1 | 5/2002 | Natsumeda et al. |
| 2002/0123864 | A1 | 9/2002 | Eryurek et al. |
| 2002/0147506 | A1 | 10/2002 | Eryurek et al. |
| 2002/0177909 | A1 | 11/2002 | Fu et al. |
| 2003/0005486 | A1 | 1/2003 | Ridolfo et al. |
| 2003/0014130 | A1 | 1/2003 | Grumelart |
| 2003/0073432 | A1 | 4/2003 | Meade, II |
| 2003/0158704 | A1 | 8/2003 | Triginai et al. |
| 2003/0171851 | A1 | 9/2003 | Brickfield et al. |
| 2003/0200059 | A1 | 10/2003 | Ignatowski et al. |
| 2004/0068390 | A1 | 4/2004 | Saunders |
| 2004/0128314 | A1 | 7/2004 | Katibah et al. |
| 2004/0133314 | A1 | 7/2004 | Ehlers et al. |
| 2004/0199360 | A1 | 10/2004 | Friman et al. |
| 2005/0055308 | A1 | 3/2005 | Meyer et al. |
| 2005/0108262 | A1 | 5/2005 | Fawcett et al. |
| 2005/0154494 | A1 | 7/2005 | Ahmed |
| 2005/0278703 | A1 | 12/2005 | Lo et al. |
| 2005/0283337 | A1 | 12/2005 | Sayal |
| 2006/0095521 | A1 | 5/2006 | Patinkin |
| 2006/0140207 | A1 | 6/2006 | Eschbach et al. |
| 2006/0184479 | A1 | 8/2006 | Levine |
| 2006/0200476 | A1 | 9/2006 | Gottumukkala et al. |
| 2006/0265751 | A1 | 11/2006 | Cosquer et al. |
| 2006/0271589 | A1 | 11/2006 | Horowitz et al. |
| 2007/0028179 | A1 | 2/2007 | Levin et al. |
| 2007/0203693 | A1 | 8/2007 | Estes |
| 2007/0261062 | A1 | 11/2007 | Bansal et al. |

(56) References Cited

U.S. PATENT DOCUMENTS

2007/0273497 A1 11/2007 Kuroda et al.
2007/0273610 A1 11/2007 Baillot
2008/0034425 A1 2/2008 Overcash et al.
2008/0094230 A1 4/2008 Mock et al.
2008/0097816 A1 4/2008 Freire et al.
2008/0186160 A1 8/2008 Kim et al.
2008/0249756 A1 10/2008 Chaisuparasmikul
2008/0252723 A1 10/2008 Park
2008/0281472 A1 11/2008 Podgorny et al.
2009/0195349 A1 8/2009 Frader-Thompson et al.
2010/0045439 A1 2/2010 Tak et al.
2010/0058248 A1 3/2010 Park
2010/0131533 A1 5/2010 Ortiz
2010/0274366 A1 10/2010 Fata et al.
2010/0281387 A1 11/2010 Holland et al.
2010/0286937 A1 11/2010 Hedley et al.
2010/0324962 A1 12/2010 Nesler et al.
2011/0015802 A1 1/2011 Imes
2011/0047418 A1 2/2011 Drees et al.
2011/0061015 A1 3/2011 Drees et al.
2011/0071685 A1 3/2011 Huneycutt et al.
2011/0077950 A1 3/2011 Hughston
2011/0087650 A1 4/2011 Mackay et al.
2011/0087988 A1 4/2011 Ray et al.
2011/0088000 A1 4/2011 Mackay
2011/0125737 A1 5/2011 Pothering et al.
2011/0137853 A1 6/2011 Mackay
2011/0153603 A1 6/2011 Adiba et al.
2011/0154363 A1 6/2011 Karmarkar
2011/0157357 A1 6/2011 Weisensale et al.
2011/0178977 A1 7/2011 Drees
2011/0191343 A1 8/2011 Heaton et al.
2011/0205022 A1 8/2011 Cavallaro et al.
2011/0218777 A1 9/2011 Chen et al.
2012/0011126 A1 1/2012 Park et al.
2012/0011141 A1 1/2012 Park et al.
2012/0022698 A1 1/2012 Mackay
2012/0062577 A1 3/2012 Nixon
2012/0064923 A1 3/2012 Imes et al.
2012/0083930 A1 4/2012 Ilic et al.
2012/0100825 A1 4/2012 Sherman et al.
2012/0101637 A1 4/2012 Imes et al.
2012/0135759 A1 5/2012 Imes et al.
2012/0136485 A1 5/2012 Weber et al.
2012/0158633 A1 6/2012 Eder
2012/0259583 A1 10/2012 Noboa et al.
2012/0272228 A1 10/2012 Marndi et al.
2012/0278051 A1 11/2012 Jiang et al.
2013/0007063 A1 1/2013 Kalra et al.
2013/0038430 A1 2/2013 Blower et al.
2013/0038707 A1 2/2013 Cunningham et al.
2013/0060820 A1 3/2013 Bulusu et al.
2013/0086497 A1 4/2013 Ambuhl et al.
2013/0097706 A1 4/2013 Titonis et al.
2013/0103221 A1 4/2013 Raman et al.
2013/0167035 A1 6/2013 Imes et al.
2013/0170710 A1 7/2013 Kuoch et al.
2013/0204836 A1 8/2013 Choi et al.
2013/0246916 A1 9/2013 Reimann et al.
2013/0247205 A1 9/2013 Schrecker et al.
2013/0262035 A1 10/2013 Mills
2013/0275174 A1 10/2013 Bennett et al.
2013/0275908 A1 10/2013 Reichard
2013/0297050 A1 11/2013 Reichard et al.
2013/0298244 A1 11/2013 Kumar et al.
2013/0331995 A1 12/2013 Rosen
2013/0338970 A1 12/2013 Reghetti
2014/0032506 A1 1/2014 Hoey et al.
2014/0059483 A1 2/2014 Mairs et al.
2014/0081652 A1 3/2014 Klindworth
2014/0100840 A1* 4/2014 Pfeifer ................ G06F 16/3328
703/22
2014/0135952 A1 5/2014 Maehara
2014/0152651 A1 6/2014 Chen et al.
2014/0172184 A1 6/2014 Schmidt et al.
2014/0189861 A1 7/2014 Gupta et al.
2014/0207282 A1 7/2014 Angle et al.
2014/0258052 A1 9/2014 Khuti et al.
2014/0269614 A1 9/2014 Maguire et al.
2014/0277765 A1 9/2014 Karimi et al.
2014/0278461 A1 9/2014 Artz
2014/0327555 A1 11/2014 Sager et al.
2015/0019174 A1 1/2015 Kiff et al.
2015/0042240 A1 2/2015 Aggarwal et al.
2015/0105917 A1 4/2015 Sasaki et al.
2015/0145468 A1 5/2015 Ma et al.
2015/0156031 A1 6/2015 Fadell et al.
2015/0168931 A1 6/2015 Jin
2015/0172300 A1 6/2015 Cochenour
2015/0178421 A1 6/2015 Borrelli et al.
2015/0185261 A1 7/2015 Frader-Thompson et al.
2015/0186777 A1 7/2015 Lecue et al.
2015/0202962 A1 7/2015 Habashima et al.
2015/0204563 A1 7/2015 Imes et al.
2015/0235267 A1 8/2015 Steube et al.
2015/0241895 A1 8/2015 Lu et al.
2015/0244730 A1 8/2015 Vu et al.
2015/0244732 A1 8/2015 Golshan et al.
2015/0261863 A1 9/2015 Dey et al.
2015/0263900 A1 9/2015 Polyakov et al.
2015/0286969 A1 10/2015 Warner et al.
2015/0295796 A1 10/2015 Hsiao et al.
2015/0304193 A1 10/2015 Ishii et al.
2015/0316918 A1 11/2015 Schleiss et al.
2015/0324422 A1 11/2015 Elder
2015/0341212 A1 11/2015 Hsiao et al.
2015/0348417 A1 12/2015 Ignaczak et al.
2015/0379080 A1 12/2015 Jochimski
2016/0011753 A1 1/2016 McFarland et al.
2016/0033946 A1 2/2016 Zhu et al.
2016/0035246 A1 2/2016 Curtis
2016/0065601 A1 3/2016 Gong et al.
2016/0070736 A1 3/2016 Swan et al.
2016/0078229 A1 3/2016 Gong et al.
2016/0090839 A1 3/2016 Stolarczyk
2016/0119434 A1 4/2016 Dong et al.
2016/0127712 A1 5/2016 Alfredsson et al.
2016/0139752 A1 5/2016 Shim et al.
2016/0163186 A1 6/2016 Davidson et al.
2016/0170390 A1 6/2016 Xie et al.
2016/0171862 A1 6/2016 Das et al.
2016/0173816 A1 6/2016 Huenerfauth et al.
2016/0179315 A1 6/2016 Sarao et al.
2016/0179342 A1 6/2016 Sarao et al.
2016/0179990 A1 6/2016 Sarao et al.
2016/0195856 A1 7/2016 Spero
2016/0212165 A1 7/2016 Singla et al.
2016/0239660 A1 8/2016 Azvine et al.
2016/0239756 A1 8/2016 Aggour et al.
2016/0247129 A1 8/2016 Song et al.
2016/0260063 A1 9/2016 Harris et al.
2016/0313751 A1 10/2016 Risbeck et al.
2016/0313752 A1 10/2016 Przybylski
2016/0313902 A1 10/2016 Hill et al.
2016/0350364 A1 12/2016 Anicic et al.
2016/0357521 A1 12/2016 Zhang et al.
2016/0357828 A1 12/2016 Tobin et al.
2016/0358432 A1 12/2016 Branscomb et al.
2016/0363336 A1 12/2016 Roth et al.
2016/0370258 A1 12/2016 Perez
2016/0378306 A1 12/2016 Kresl et al.
2016/0379326 A1 12/2016 Chan-Gove et al.
2017/0006135 A1 1/2017 Siebel
2017/0011318 A1 1/2017 Vigano et al.
2017/0017221 A1 1/2017 Lamparter et al.
2017/0039255 A1 2/2017 Raj et al.
2017/0052536 A1 2/2017 Warner et al.
2017/0053441 A1 2/2017 Nadumane et al.
2017/0063894 A1 3/2017 Muddu et al.
2017/0068409 A1 3/2017 Nair
2017/0070775 A1 3/2017 Taxier et al.
2017/0075984 A1 3/2017 Deshpande et al.
2017/0084168 A1 3/2017 Janchookiat
2017/0090437 A1 3/2017 Veeramani et al.

(56) References Cited

U.S. PATENT DOCUMENTS

| | | | |
|---|---|---|---|
| 2017/0093700 | A1 | 3/2017 | Gilley et al. |
| 2017/0098086 | A1 | 4/2017 | Hoernecke et al. |
| 2017/0103327 | A1 | 4/2017 | Penilla et al. |
| 2017/0103403 | A1 | 4/2017 | Chu et al. |
| 2017/0123389 | A1 | 5/2017 | Baez et al. |
| 2017/0134415 | A1 | 5/2017 | Muddu et al. |
| 2017/0177715 | A1 | 6/2017 | Chang et al. |
| 2017/0180147 | A1 | 6/2017 | Brandman et al. |
| 2017/0188216 | A1 | 6/2017 | Koskas et al. |
| 2017/0212482 | A1 | 7/2017 | Boettcher et al. |
| 2017/0212668 | A1 | 7/2017 | Shah et al. |
| 2017/0220641 | A1 | 8/2017 | Chi et al. |
| 2017/0230930 | A1 | 8/2017 | Frey |
| 2017/0235817 | A1 | 8/2017 | Deodhar et al. |
| 2017/0251182 | A1 | 8/2017 | Siminoff et al. |
| 2017/0270124 | A1 | 9/2017 | Nagano et al. |
| 2017/0277769 | A1 | 9/2017 | Pasupathy et al. |
| 2017/0278003 | A1 | 9/2017 | Liu |
| 2017/0294132 | A1 | 10/2017 | Colmenares |
| 2017/0315522 | A1 | 11/2017 | Kwon et al. |
| 2017/0315697 | A1 | 11/2017 | Jacobson et al. |
| 2017/0322534 | A1 | 11/2017 | Sinha et al. |
| 2017/0323389 | A1 | 11/2017 | Vavrasek |
| 2017/0329289 | A1 | 11/2017 | Kohn et al. |
| 2017/0336770 | A1 | 11/2017 | Macmillan |
| 2017/0345287 | A1 | 11/2017 | Fuller et al. |
| 2017/0351957 | A1 | 12/2017 | Lecue et al. |
| 2017/0357225 | A1 | 12/2017 | Asp et al. |
| 2017/0357490 | A1 | 12/2017 | Park et al. |
| 2017/0357908 | A1 | 12/2017 | Cabadi et al. |
| 2018/0012159 | A1 | 1/2018 | Kozloski et al. |
| 2018/0013579 | A1 | 1/2018 | Fairweather et al. |
| 2018/0024520 | A1 | 1/2018 | Sinha et al. |
| 2018/0039238 | A1 | 2/2018 | Gärtner et al. |
| 2018/0048485 | A1 | 2/2018 | Pelton et al. |
| 2018/0069932 | A1 | 3/2018 | Tiwari et al. |
| 2018/0114140 | A1 | 4/2018 | Chen et al. |
| 2018/0137288 | A1 | 5/2018 | Polyakov |
| 2018/0157930 | A1 | 6/2018 | Rutschman et al. |
| 2018/0162400 | A1 | 6/2018 | Abdar |
| 2018/0176241 | A1 | 6/2018 | Manadhata et al. |
| 2018/0198627 | A1 | 7/2018 | Mullins |
| 2018/0203961 | A1 | 7/2018 | Aisu et al. |
| 2018/0239982 | A1 | 8/2018 | Rutschman et al. |
| 2018/0275625 | A1 | 9/2018 | Park et al. |
| 2018/0276962 | A1 | 9/2018 | Butler et al. |
| 2018/0292797 | A1 | 10/2018 | Lamparter et al. |
| 2018/0329958 | A1* | 11/2018 | Choudhury ......... G06F 16/2456 |
| 2018/0336785 | A1 | 11/2018 | Ghannam et al. |
| 2018/0356775 | A1 | 12/2018 | Harvey |
| 2018/0359111 | A1 | 12/2018 | Harvey |
| 2018/0364654 | A1 | 12/2018 | Locke et al. |
| 2019/0005025 | A1 | 1/2019 | Malabarba |
| 2019/0013023 | A1 | 1/2019 | Pourmohammad et al. |
| 2019/0025771 | A1 | 1/2019 | Park et al. |
| 2019/0037135 | A1 | 1/2019 | Hedge |
| 2019/0042988 | A1 | 2/2019 | Brown et al. |
| 2019/0088106 | A1 | 3/2019 | Grundstrom |
| 2019/0094824 | A1 | 3/2019 | Xie et al. |
| 2019/0096217 | A1 | 3/2019 | Pourmohammad et al. |
| 2019/0102840 | A1 | 4/2019 | Perl et al. |
| 2019/0121801 | A1* | 4/2019 | Jethwa .................. G06F 16/243 |
| 2019/0138512 | A1 | 5/2019 | Pourmohammad et al. |
| 2019/0147883 | A1 | 5/2019 | Mellenthin et al. |
| 2019/0158309 | A1 | 5/2019 | Park et al. |
| 2019/0163152 | A1 | 5/2019 | Worrall et al. |
| 2019/0268178 | A1 | 8/2019 | Fairweather et al. |
| 2019/0310979 | A1 | 10/2019 | Masuzaki et al. |
| 2019/0377306 | A1 | 12/2019 | Harvey |
| 2020/0226156 | A1 | 7/2020 | Borra et al. |
| 2020/0285203 | A1 | 9/2020 | Thakur et al. |
| 2020/0336328 | A1 | 10/2020 | Harvey |
| 2020/0348632 | A1 | 11/2020 | Harvey |
| 2020/0387576 | A1 | 12/2020 | Brett et al. |
| 2020/0396208 | A1 | 12/2020 | Brett et al. |
| 2021/0042299 | A1 | 2/2021 | Migliori |
| 2021/0043221 | A1 | 2/2021 | Yelchuru et al. |
| 2021/0325070 | A1 | 10/2021 | Endel et al. |
| 2021/0342961 | A1 | 11/2021 | Winter et al. |
| 2021/0381711 | A1 | 12/2021 | Harvey et al. |
| 2021/0381712 | A1 | 12/2021 | Harvey et al. |
| 2021/0382445 | A1 | 12/2021 | Harvey et al. |
| 2021/0383041 | A1 | 12/2021 | Harvey et al. |
| 2021/0383042 | A1 | 12/2021 | Harvey et al. |
| 2021/0383200 | A1 | 12/2021 | Harvey et al. |
| 2021/0383219 | A1 | 12/2021 | Harvey et al. |
| 2021/0383235 | A1 | 12/2021 | Harvey et al. |
| 2021/0383236 | A1 | 12/2021 | Harvey et al. |
| 2022/0066402 | A1 | 3/2022 | Harvey et al. |
| 2022/0066405 | A1 | 3/2022 | Harvey |
| 2022/0066432 | A1 | 3/2022 | Harvey et al. |
| 2022/0066434 | A1 | 3/2022 | Harvey et al. |
| 2022/0066528 | A1 | 3/2022 | Harvey et al. |
| 2022/0066722 | A1 | 3/2022 | Harvey et al. |
| 2022/0066754 | A1 | 3/2022 | Harvey et al. |
| 2022/0066761 | A1 | 3/2022 | Harvey et al. |
| 2022/0067226 | A1 | 3/2022 | Harvey et al. |
| 2022/0067227 | A1 | 3/2022 | Harvey et al. |
| 2022/0067230 | A1 | 3/2022 | Harvey et al. |
| 2022/0069863 | A1 | 3/2022 | Harvey et al. |
| 2022/0070293 | A1 | 3/2022 | Harvey et al. |
| 2022/0121965 | A1 | 4/2022 | Chatterji et al. |
| 2022/0138684 | A1 | 5/2022 | Harvey |
| 2022/0147000 | A1 | 5/2022 | Cooley et al. |
| 2022/0150124 | A1 | 5/2022 | Cooley et al. |
| 2022/0215264 | A1 | 7/2022 | Harvey et al. |
| 2023/0010757 | A1 | 1/2023 | Preciado |
| 2023/0071312 | A1 | 3/2023 | Preciado et al. |
| 2023/0076011 | A1 | 3/2023 | Preciado et al. |
| 2023/0083703 | A1 | 3/2023 | Meiners |

FOREIGN PATENT DOCUMENTS

| | | | |
|---|---|---|---|
| AU | 2019351573 | A1 | 5/2021 |
| CN | 101415011 | A | 4/2009 |
| CN | 102136099 | A | 7/2011 |
| CN | 102136100 | A | 7/2011 |
| CN | 102650876 | A | 8/2012 |
| CN | 104040583 | A | 9/2014 |
| CN | 104603832 | A | 5/2015 |
| CN | 104919484 | A | 9/2015 |
| CN | 106204392 | A | 12/2016 |
| CN | 106406806 | A | 2/2017 |
| CN | 106960269 | A | 7/2017 |
| CN | 107147639 | A1 | 9/2017 |
| CN | 107598928 | A | 1/2018 |
| EP | 2 528 033 | A1 | 11/2012 |
| EP | 3 268 821 | B1 | 1/2018 |
| EP | 3 324 306 | A1 | 5/2018 |
| EP | 4 226 263 | A1 | 8/2023 |
| JP | H10-049552 | A | 2/1998 |
| JP | 2003-162573 | A | 6/2003 |
| JP | 2007-018322 | A | 1/2007 |
| JP | 4073946 | B1 | 4/2008 |
| JP | 2008-107930 | A | 5/2008 |
| JP | 2013-152618 | A | 8/2013 |
| JP | 2014-044457 | A | 3/2014 |
| KR | 2016/0102923 | A | 8/2016 |
| WO | WO-2009/020158 | A1 | 2/2009 |
| WO | WO-2011/100255 | A2 | 8/2011 |
| WO | WO-2013/050333 | A1 | 4/2013 |
| WO | WO-2015/106702 | A1 | 7/2015 |
| WO | WO-2015/145648 | A1 | 10/2015 |
| WO | WO-2017/035536 | A1 | 3/2017 |
| WO | WO-2017/192422 | A1 | 11/2017 |
| WO | WO-2017/194244 | A1 | 11/2017 |
| WO | WO-2017/205330 | A1 | 11/2017 |
| WO | WO-2017/213918 | A1 | 12/2017 |
| WO | WO-2018/132112 | A1 | 7/2018 |
| WO | WO-2020/061621 | A1 | 4/2020 |
| WO | WO-2022/042925 | A1 | 3/2022 |
| WO | WO-2022/103812 | A1 | 5/2022 |
| WO | WO-2022/103813 | A1 | 5/2022 |
| WO | WO-2022/103820 | A1 | 5/2022 |

(56) References Cited

FOREIGN PATENT DOCUMENTS

| | | |
|---|---|---|
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

U.S. Appl. No. 17/567,275, Passivelogic, Inc.
U.S. Appl. No. 17/722,115, Passivelogic, Inc.
Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 23, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick, " BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61.
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.

(56) References Cited

OTHER PUBLICATIONS

International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing Ltd., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on the Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).

* cited by examiner

800

```
function sendDrEvents( ) {
        obt.exec (
        “SELECT locations WHERE something=’example” //query
                , {  //context
                        requestid: ‘1234’,
                        additional: ‘for-processing’
                }
        )
}
```

```
function  drEventProcessor (ctx, record)  {
        var  context = ctx;
        var requestid = ctx.requestid;

        sendRequest  (record.pro1, record.prop2);
}
```

FIG. 9

BUILDING DATA PLATFORM WITH CONTEXT BASED TWIN FUNCTION PROCESSING

BACKGROUND

This application relates to a building system of a building. This application relates more particularly to processing data of the building system.

A building may aggregate and store building data received from building equipment and/or other data sources. The building data can be stored in a database. In some embodiments, if a user wishes to derive information from the building data, the user may need to provide a query to the database to retrieve the building data. The user may then cause or perform various operations to process against the retrieved building data. However, requiring a user to review a returned data set of a query and identify the necessary data elements for processing may be inefficient and result in errors.

SUMMARY

Contextual Query Triggered Processing

One implementation of the present disclosure is a building system of a building including one or more memory devices having instructions stored thereon, that, when executed by one or more processors, cause the one or more processors to receive a query from a requesting system, the query including one or more query parameters and a context, the context indicating one or more purposes for the query including the one or more query parameters. The instructions cause the one or more processors to retrieve, based on the one or more query parameters, first data of the building system from a data storage system, identify, based on the context, one or more processing operations to perform to generate a processing result with the first data, the processing result fulfilling the one or more purposes indicated by the context, perform the one or more processing operations with the first data to generate second data, and provide a response to the requesting system with the second data.

In some embodiments, the instructions cause the one or more processors to receive the query from a user device of a user. In some embodiments, the instructions cause the one or more processors to determine, based on the context, the one or more processing operations and perform the one or more processing operations without requiring any input from the user.

In some embodiments, the instructions cause the one or more processors to receive the query from a user device of a user. In some embodiments, the instructions cause the one or more processors to determine, based on the context, the one or more processing operations and perform the one or more processing operations without requiring the user to identify the one or more processing operations and trigger execution of the one or more processing operations.

In some embodiments, the data storage system is a building graph including nodes representing people, spaces, events, and devices of the building and edges between the nodes representing relationships between the people, the spaces, the events, and the devices of the building. In some embodiments, the instructions cause the one or more processors to retrieve one or more nodes of the plurality of nodes or one or more edges of the plurality of edges and perform the one or more processing operations with the one or more nodes of the plurality of nodes or the one or more edges of the plurality of edges.

In some embodiments, the instructions cause the one or more processors to generate an operation to monitor the data storage system based on the context, the operation identifying one or more new events added to a building graph that affects the processing result, cause a twin function to execute responsive to identifying the changes in the building graph that affect the processing result, the twin function including the one or more processing operations, execute the twin function based on the one or more new events and the context to generate the processing result, and add the processing result to the building graph.

In some embodiments, the instructions cause the one or more processors to perform the one or more processing operations by executing a twin function, wherein the twin function receives the first data and the context as inputs to the twin function and the twin function executes to generate the second data.

In some embodiments, the instructions cause the one or more processors to spin up the twin function by creating a server with allocated processor resources and memory resources to execute the twin function, responsive to determining to execute the twin function and spin down the twin function by releasing the allocated processor resources and memory resources responsive to determining that the twin function has finished execution.

In some embodiments, the first data indicates multiple data elements. In some embodiments, the instructions cause the one or more processors to generate a first twin function to perform one or more first operations on a first data element of the multiple data elements and a second twin function to perform one or more second operations on a second data element of the multiple data elements.

In some embodiments, the multiple data elements each meet one or more requirements defined by the one or more query parameters. In some embodiments, the instructions cause the one or more processors to generate the first twin function for the first data element of the multiple data elements and the second twin function for the second data element of the multiple data elements responsive to identifying the multiple data elements with the one or more query parameters; execute the first twin function with the context and the first data element, and execute the second twin function with the context and the second data element.

In some embodiments, the first twin function receives the first data element and the context as inputs to the first twin function. In some embodiments, the second twin function receive the second data element and the context as inputs to the second twin function.

Another implementation of the present disclosure is a method including receiving, by a processing circuit, a query from a requesting system, the query including one or more query parameters and a context, the context indicating one or more purposes for the query including the one or more query parameters and retrieving, by the processing circuit, based on the one or more query parameters, first data from a data storage system. The method further includes identifying, by the processing circuit, based on the context, one or more processing operations to perform to generate a processing result with the first data, the processing result fulfilling the one or more purposes indicated by the context, performing, by the processing circuit, the one or more processing operations with the first data to generate second data, and providing, by the processing circuit, a response to the requesting system with the second data.

In some embodiments, the requesting system is a user device of a user. In some embodiments, the method includes determining, by the processing circuit, based on the context, the one or more processing operations and performing, by the processing circuit, the one or more processing operations without requiring any input from the user.

In some embodiments, the requesting system is a user device of a user. In some embodiments, the method further includes determining, by the processing circuit, based on the context, the one or more processing operations and performing, by the processing circuit, the one or more processing operations without requiring the user to identify the one or more processing operations and trigger execution of the one or more processing operations.

In some embodiments, the data storage system is a building graph including a plurality of nodes representing people, spaces, events, and devices of a building and a plurality of edges between the plurality of nodes representing relationships between the people, the spaces, the events, and the devices of the building. In some embodiments, the method further includes retrieving, by the processing circuit, one or more nodes of the plurality of nodes or one or more edges of the plurality of edges and performing, by the processing circuit, the one or more processing operations with the one or more nodes of the plurality of nodes or the one or more edges of the plurality of edges.

In some embodiments, the method further includes generating, by the processing circuit, an operation to monitor the data storage system based on the context, the operation identifying one or more new events added to a building graph that affects the processing result, causing, by the processing circuit, a twin function to execute responsive to identifying the changes in the building graph that affect the processing result, the twin function including the one or more processing operations, executing, by the processing circuit, the twin function based on the one or more new events and the context to generate the processing result, and adding, by the processing circuit, the processing result to the building graph.

In some embodiments, the method further includes performing, by the processing circuit, the one or more processing operations includes executing a twin function, wherein the twin function receives the first data and the context as inputs to the twin function and the twin function executes to generate the second data.

In some embodiments, the method further includes spinning up, by the processing circuit, the twin function by creating a server with allocated processor resources and memory resources to execute the twin function, responsive to determining to execute the twin function and spinning down, by the processing circuit, the twin function by releasing the allocated processor resources and memory resources responsive to determining that the twin function has finished execution.

In some embodiments, the first data indicates multiple data elements. In some embodiments, the method further includes generating, by the processing circuit, a first twin function to perform one or more first operations on a first data element of the multiple data elements and a second twin function to perform one or more second operations on a second data element of the multiple data elements.

In some embodiments, the multiple data elements each meet one or more requirements defined by the one or more query parameters. In some embodiments, the method further includes generating, by the processing circuit, the first twin function for the first data element of the multiple data elements and the second twin function for the second data element of the multiple data elements responsive to identifying the multiple data elements with the one or more query parameters and executing, by the processing circuit, the first twin function with the context and the first data element, and executing, by the processing circuit, the second twin function with the context and the second data element.

Another implementation of the present disclosure is a system including one or more memory devices having instructions stored thereon and one or more processors. The one or more processors are configured to receive a query from a requesting system, the query including one or more query parameters and a context, the context indicating one or more purposes for the query including the one or more query parameters and retrieve, based on the one or more query parameters, first data from a data storage system. The one or more processors are configured to identify, based on the context, one or more processing operations to perform to generate a processing result with the first data, the processing result fulfilling the one or more purposes indicated by the context, perform the one or more processing operations with the first data to generate second data, and provide a response to the requesting system with the second data.

Context Based Twin Function Processing

One implementation of the present disclosure is a building system of a building including one or more memory devices having instructions stored thereon, that, when executed by one or more processors, cause the one or more processors to receive a selection including a context and a twin function, the context indicating one or more purposes for the twin function, wherein a processing result is generated by the twin function, generate an operation to monitor a building graph based on the context, the operation identifying whether one or more new events are added to the building graph, the one or more new events affecting the processing result, cause the twin function to execute responsive to identifying the one or more new events added to the building graph that affect the processing result, execute the twin function based on the one or more new events and the context to generate the processing result, and add the processing result to the building graph.

In some embodiments, the context indicates a plurality of targets of the building graph to run the twin function for. In some embodiments, the instructions cause the one or more processors to identify the plurality of targets of the building graph by querying the building graph with the context and execute a plurality of twin functions for each of the plurality of targets responsive to identifying the one or more new events added to the building graph that affect the processing result.

In some embodiments, the one or more processors receive the context and the selection of the twin function from a user via a user device.

In some embodiments, the twin function receives the context, the one or more new events, and one or more runtime configuration rules as inputs. In some embodiments, the twin function generates the processing result as an output.

In some embodiments, the instructions cause the one or more processors to cause a user interface of a user device to display the processing result to a user.

In some embodiments, the instructions cause the one or more processors to store a plurality of twin functions in the one or more memory devices, each of the plurality of twin functions including one or more predefined operations, each of the plurality of twin functions including an event input, a context input, and a rule input and wherein the selection of the twin function selects the twin function from the plurality of twin functions stored in the one or more memory devices.

In some embodiments, the instructions cause the one or more processors to generate a context query that queries the building graph to identify the one or more new events that, when added to the building graph, affect the processing result and generate the operation to monitor the building graph by causing the operation to include the context query and execute the context query on the building graph to determine whether the one or more new events have been added to the building graph.

In some embodiments, the instructions cause the one or more processors to spin up the twin function by creating a server with allocated processor resources and memory resources to execute the twin function, responsive to determining to execute the twin function and spin down the twin function by releasing the allocated processor resources and memory resources responsive to determining that the twin function has finished execution.

In some embodiments, the instructions cause the one or more processors to determine that one or more operations performed by the twin function require additional computational resources and allocate the additional computational resources to the server to execute and twin function with the additional computational resources.

In some embodiments, the instructions cause the one or more processors to receive an indication to execute multiple instances of the twin function, spin out the twin function by generating a plurality of servers, one server for each of the multiple instances of the twin function, each of the plurality of servers configured to execute one instance of the multiple instances of the twin function, each of the plurality of servers including allocated processing resources and allocated memory resources, and spin down each of the multiple instances of the twin function by releasing the allocated processing resources and the allocated memory resources of the plurality of servers.

Another implementation of the present disclosure is a method including receiving, by a processing circuit, a selection including a context and a twin function, the context indicating one or more purposes for the twin function, wherein a processing result is generated by the twin function and generating, by the processing circuit, an operation to monitor a building graph based on the context, the operation identifying whether one or more new events are added to the building graph, the one or more new events affecting the processing result. The method includes causing, by the processing circuit, the twin function to execute responsive to identifying the one or more new events added to the building graph that affect the processing result, executing, by the processing circuit, the twin function based on the one or more new events and the context to generate the processing result, and adding, by the processing circuit, the processing result to the building graph.

In some embodiments, the context indicates a plurality of targets of the building graph to run the twin function for. In some embodiments, the method includes identifying, by the processing circuit, the plurality of targets of the building graph by querying the building graph with the context and executing, by the processing circuit, a plurality of twin functions for each of the plurality of targets responsive to identifying the one or more new events added to the building graph that affect the processing result.

In some embodiments, the method further includes receiving, by the processing circuit, the context and the selection of the twin function from a user via a user device.

In some embodiments, the twin function receives the context, the one or more new events, and one or more runtime configuration rules as inputs. In some embodiments, wherein the twin function generates the processing result as an output.

In some embodiments, the method further includes causing, by the processing circuit, a user interface of a user device to display the processing result to a user.

In some embodiments, the method further includes storing, by the processing circuit, a plurality of twin functions in one or more memory devices, each of the plurality of twin functions including one or more predefined operations, each of the plurality of twin functions including an event input, a context input, and a rule input. In some embodiments, the selection of the twin function selects the twin function from the plurality of twin functions stored in the one or more memory devices.

In some embodiments, the method further includes generating, by the processing circuit, a context query that queries the building graph to identify the one or more new events that, when added to the building graph, affect the processing result and generating, by the processing circuit, the operation to monitor the building graph by causing the operation to include the context query and execute the context query on the building graph to determine whether the one or more new events have been added to the building graph.

In some embodiments, the method further includes spinning up, by the processing circuit, the twin function by creating a server with allocated processor resources and memory resources to execute the twin function, responsive to determining to execute the twin function and spinning down, by the processing circuit, the twin function by releasing the allocated processor resources and memory resources responsive to determining that the twin function has finished execution.

In some embodiments, the method further includes determining, by the processing circuit, that one or more operations performed by the twin function require additional computational resources and allocating, by the processing circuit, the additional computational resources to the server to execute the twin function with the additional computational resources.

In some embodiments, the method further includes receiving, by the processing circuit, an indication to execute multiple instances of the twin function, spinning out, by the processing circuit, the twin function by generating a plurality of servers, one server for each of the multiple instances of the twin function, each of the plurality of servers configured to execute one instance of the multiple instances of the twin function, each of the plurality of servers including allocated processing resources and allocated memory resources, and spinning down, by the processing circuit, each of the multiple instances of the twin function by releasing the allocated processing resources and the allocated memory resources of the plurality of servers.

Another implementation of the present disclosure is a building system of a building one or more memory devices having instructions stored thereon and one or more processors configured to execute the instructions to receive a selection including a context and a twin function, the context indicating one or more purposes for the twin function, wherein a processing result is generated by the twin function. The one or more processors are configured to execute the instructions to generate an operation to monitor a building graph based on the context, the operation identifying whether one or more new events are added to the building graph, the one or more new events affecting the processing result, cause the twin function to execute responsive to identifying the one or more new events added to the building graph that affect the processing result, execute the twin function based on the one or more new events and the context to generate the processing result, and add the processing result to the building graph.

In some embodiments, the instructions cause the one or more processors to generate a context query that queries the building graph to identify the one or more new events that, when added to the building graph, affect the processing result and generate the operation to monitor the building graph by causing the operation to include the context query and execute the context query on the building graph to determine whether the one or more new events have been added to the building graph.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 8 is a code snippet of a query that includes query parameters and context, according to an exemplary embodiment.

FIG. 9 is a code snippet of a function that operates based on a context and a record, according to an exemplary embodiment.

DETAILED DESCRIPTION

Overview

Figure 1:
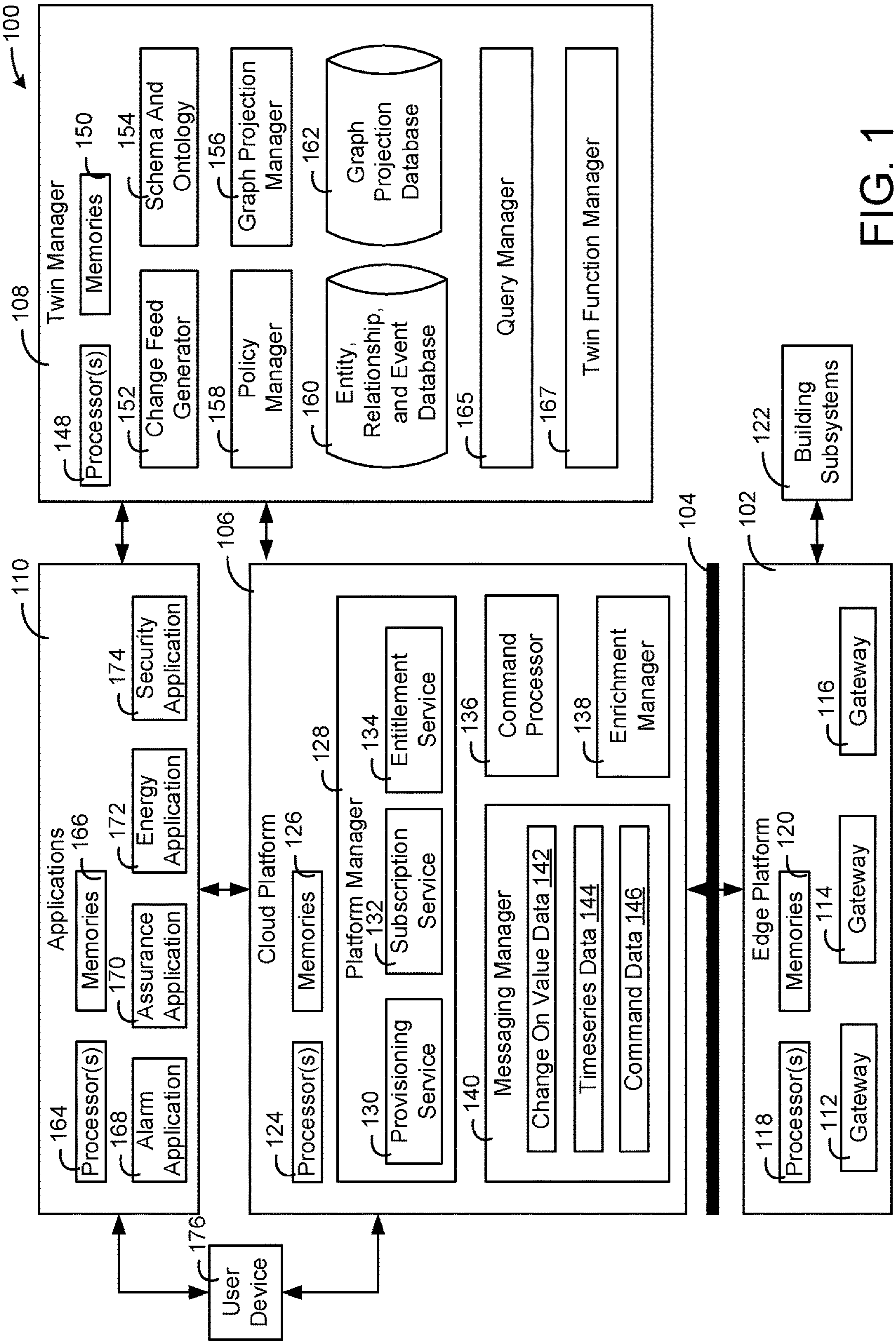
FIG. 1 is a block diagram of a building data platform including an edge platform, a cloud platform, and a twin manager, according to an exemplary embodiment.

Referring generally to the figures, systems and methods for context based processing are shown, according to various exemplary embodiments. In some embodiments, a building system can manage a query that that includes query parameters and context where returned results of the query based on the query parameters can be used for additional processing based on the context. In some embodiments, the building system can manage twin functions that spin up (e.g., instantiate or create) or down (e.g., deallocate) based on whether a context query is triggered, the twin functions operating based on context, events, and/or rules.

In some embodiments, the building system can receive a query from a requesting system, e.g., user input received from a user system, a query received from a software application, etc. The query can include query parameters, context, and an indication of an event processor, e.g., a twin function. The building system can handle the query by querying a data structure with the query parameters. The query parameters may define information that the query is searching for. Instead of, or in addition to, replying to the requesting system with the information, the building system can cause twin functions to execute based on the retrieved information and/or the context. The result of the twin function executing based on the retrieved information and/or the context may be result data which can be provided by the building system to the requesting system. In this regard, processing can be handled without requiring the user to explicitly define or initiate the processing.

In some embodiments, the context can identify information for performing operations, e.g., a goal or purpose of the query and/or the query parameters. For example, if the query includes parameters that identify buildings in a geographic area and the context indicates that a demand response event for a demand response will occur at a particular time in the future that the buildings in the geographic area need to respond to, the building system can retrieve indications of buildings in the geographic area based on the query parameters and determine load amounts for each of the buildings based on the context. The determination of load amounts can meet a goal and/or requirement of the context, e.g., to respond to the demand response event.

As another example, the query could include query parameters identifying thermostats on a particular floor of a building while the context could indicate a desire to improve to occupant comfort on the particular floor. The building system could retrieve indications of each of the thermostats. Furthermore, based on the context of a desired improvement to occupant comfort, the building system could retrieve indications of setpoints for each thermostat. The building system can be configured to perform processing to identify new setpoint values for the identified thermostats that improve the occupant comfort. The building system can update the identified setpoints with the new setpoint values and/or return the new setpoint values to the requesting system.

The building system can be configured to handle twin functions. A user and/or other system can select a twin function and provide a context. The context can define a pattern (e.g., particular type of nodes related by particular types of edges) and/or piece of information in a graph data structure. The building system can be configured to monitor the contextual query against a graph data structure to determine whether a contextual query based on the context is triggered. Responsive to detecting that the query is triggered, the building system can cause the selected twin function to execute. The twin function can execute with user defined rules, context, and/or events. The context can indicate a specific target identifying what the twin function is running for. The events can indicate data that the twin function operates on. The rules can indicate runtime operations set by a user.

For example, a user could select a temperature control twin function for execution on twins of a particular floor responsive to occupancy events occurring within the floors. The building system can identify whether a floor has received an occupancy event. Responsive to detecting that the floor has received the occupancy event, the building system can identify a thermostat of the floor and cause a temperature control twin function to operate for the identified thermostat to execute to determine a temperature setpoint. In some embodiments, the twin function can track occupancy, identify how many people a user has come into contact with, etc. The twin functions can be contextual functions that execute based on raw event data and also execute against a digital twin.

Referring now to FIG. 1, a building data platform 100 including an edge platform 102, a cloud platform 106, and a twin manager 108 are shown, according to an exemplary embodiment. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within the building. However, any combination of on-premises and off-premises components of the building data platform 100 can be implemented.

The building data platform 100 includes applications 110. The applications 110 can be various applications that operate to manage the building subsystems 122. The applications 110 can be remote or on-premises applications (or a hybrid of both) that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

```
{
  "id": "someguid",
  "eventType": "Device_Heartbeat",
  "eventTime": "2018-01-27T00:00:00+00:00"
  "eventValue": 1,
  "deviceID": "someguid"
}
```

An example of an enriched event generated by the enrichment manager 138 may be:

```
{
  "id": "someguid",
  "eventType": "Device_Heartbeat",
  "eventTime": "2018-01-27T00:00:00+00:00"
  "eventValue": 1,
  "deviceID": "someguid",
  "buildingName": "Building-48",
  "buildingID": "SomeGuid",
  "panelID": "SomeGuid",
  "panelName": "Building-48-Panel-13",
  "cityID": 371,
  "cityName": "Milwaukee",
  "stateID": 48,
  "stateName": "Wisconsin (WI)",
  "countryID": 1,
  "countryName": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building. The twin manager 108 can include a change feed generator 152, a schema and ontology 154, a projection manager 156, a policy manager 158, an entity, relationship, and event database 160, and a graph projection database 162.

Figure 11:
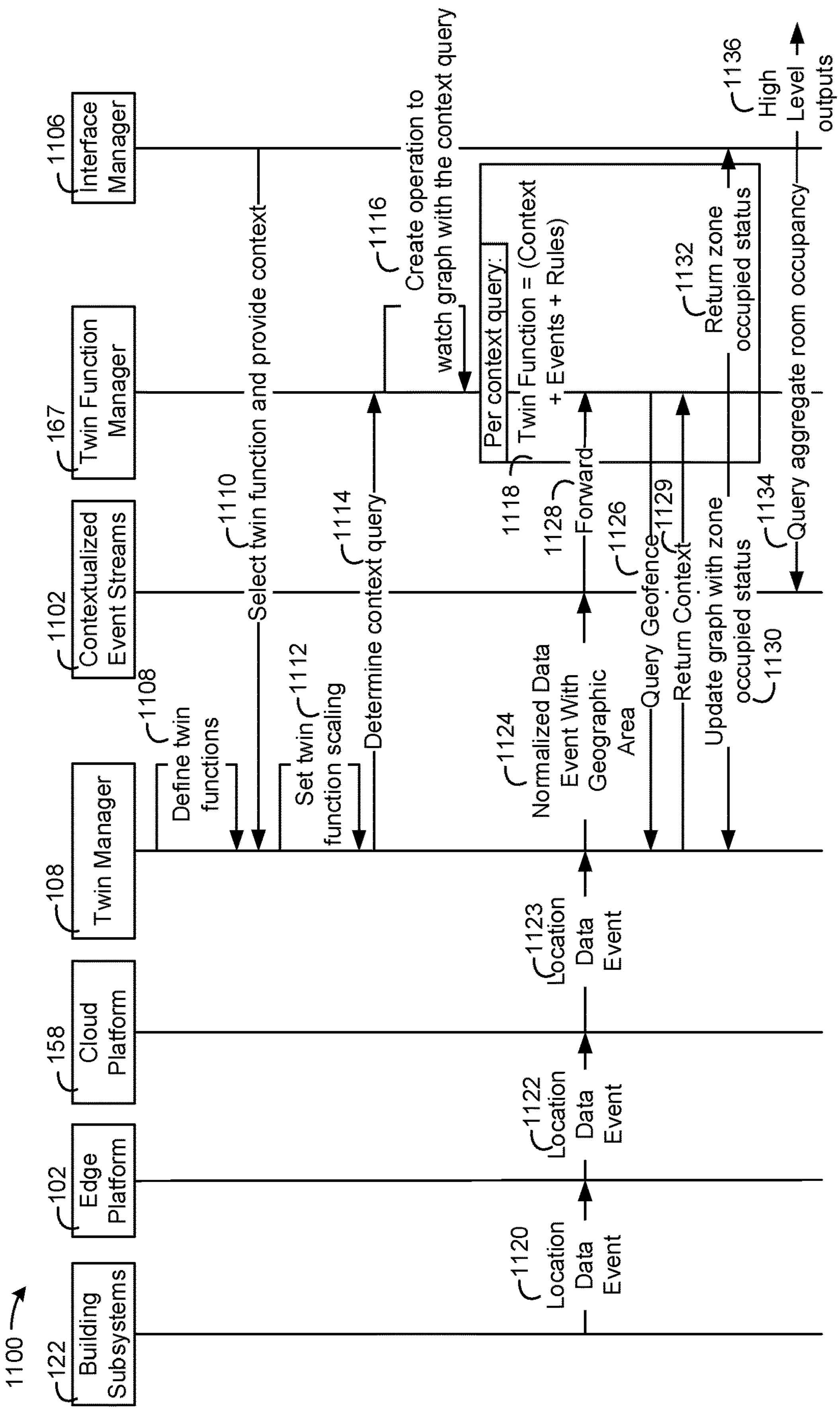
FIG. 11 is a flow diagram of a process of managing twin functions that execute based on a context, events, and rules, according to an exemplary embodiment.
Figure 12:
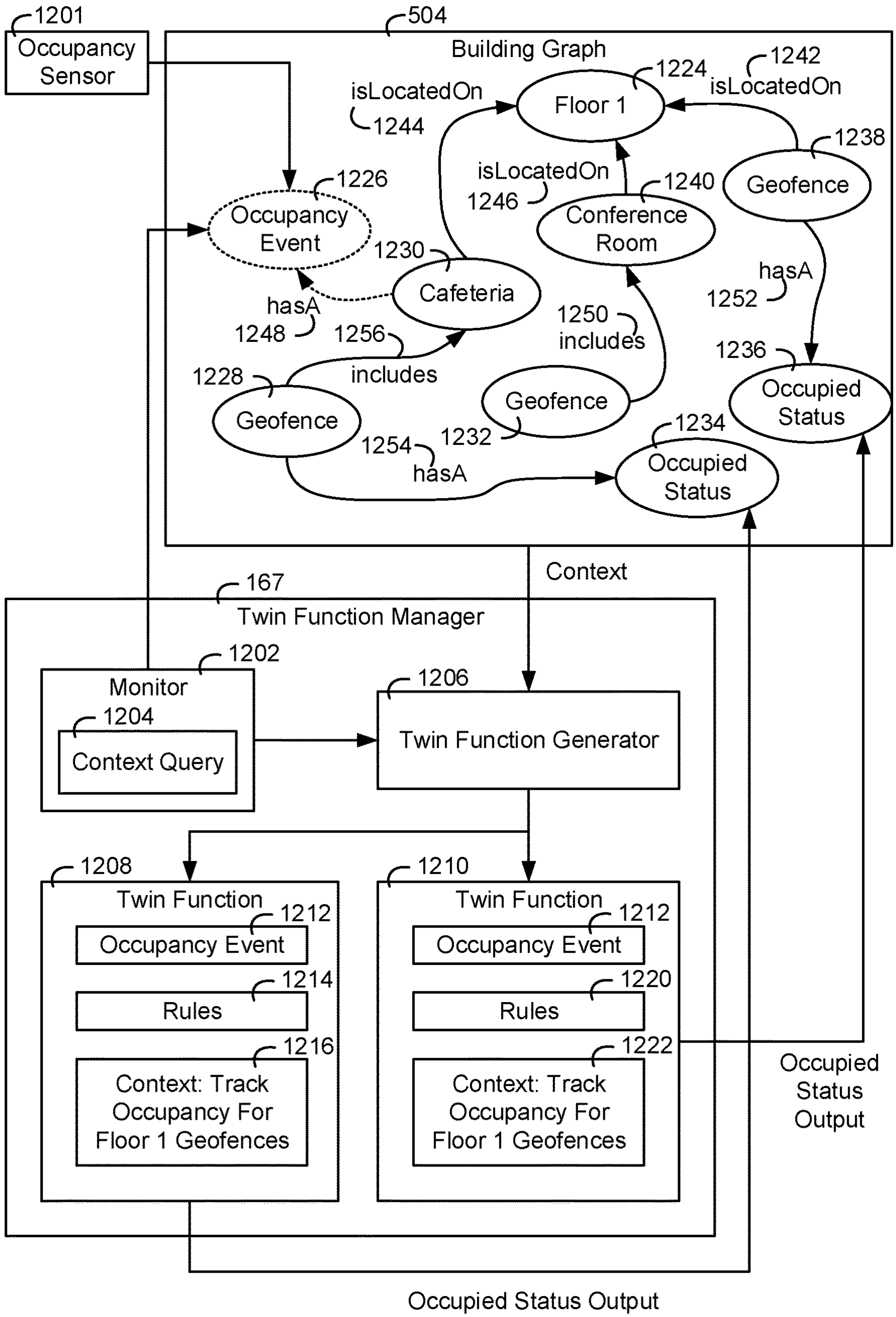
FIG. 12 is a block diagram of a twin function manager monitoring a graph data structure and generating twin functions responsive to detecting an event in the graph data structure, according to an exemplary embodiment.
Figure 13:
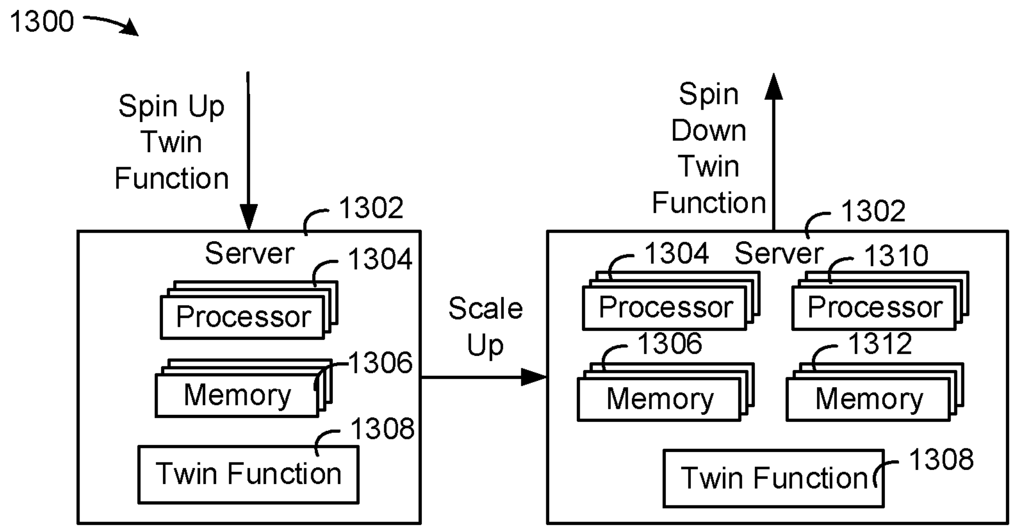
FIG. 13 is a block diagram of server scaling up to accommodate processing requirements for a twin function, according to an exemplary embodiment.

The graph projection manager 156 can be configured to construct graph projections and store the graph projections in the graph projection database 162. Examples of graph projections are shown in FIGS. 11-13. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions. Subscriptions can be subscriptions of a particular tenant as described in FIG. 24.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

The graph projections of the graph projection database 162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region ↔ Building ↔ Floor ↔ Space ↔ Asset

For the ontology of a subscription of "Customer B," the graph projection manager 156 can create relationships based on the rule:

Building ↔ Floor ↔ Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc.

The twin manager 108 includes a query manager 165 and a twin function manager 167. The query manger 164 can be configured to handle queries received from a requesting system, e.g., the user device 176, the applications 110, and/or any other system. The query manager 165 can receive queries that include query parameters and context. The query manager 165 can query the graph projection database 162 with the query parameters to retrieve a result. The query manager 165 can then cause an event processor, e.g., a twin function, to operate based on the result and the context. In some embodiments, the query manager 165 can select the twin function based on the context and/or perform operates based on the context. In some embodiments, the query manager 165 is configured to perform the operations described with reference to FIGS. 5-10.

The twin function manager 167 can be configured to manage the execution of twin functions. The twin function manager 167 can receive an indication of a context query that identifies a particular data element and/or pattern in the graph projection database 162. Responsive to the particular data element and/or pattern occurring in the graph projection database 162 (e.g., based on a new data event added to the graph projection database 162 and/or change to nodes or edges of the graph projection database 162, the twin function manager 167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc. The twin function manager 167 can be configured to perform the operations of the FIGS. 11-15.

Figure 2:
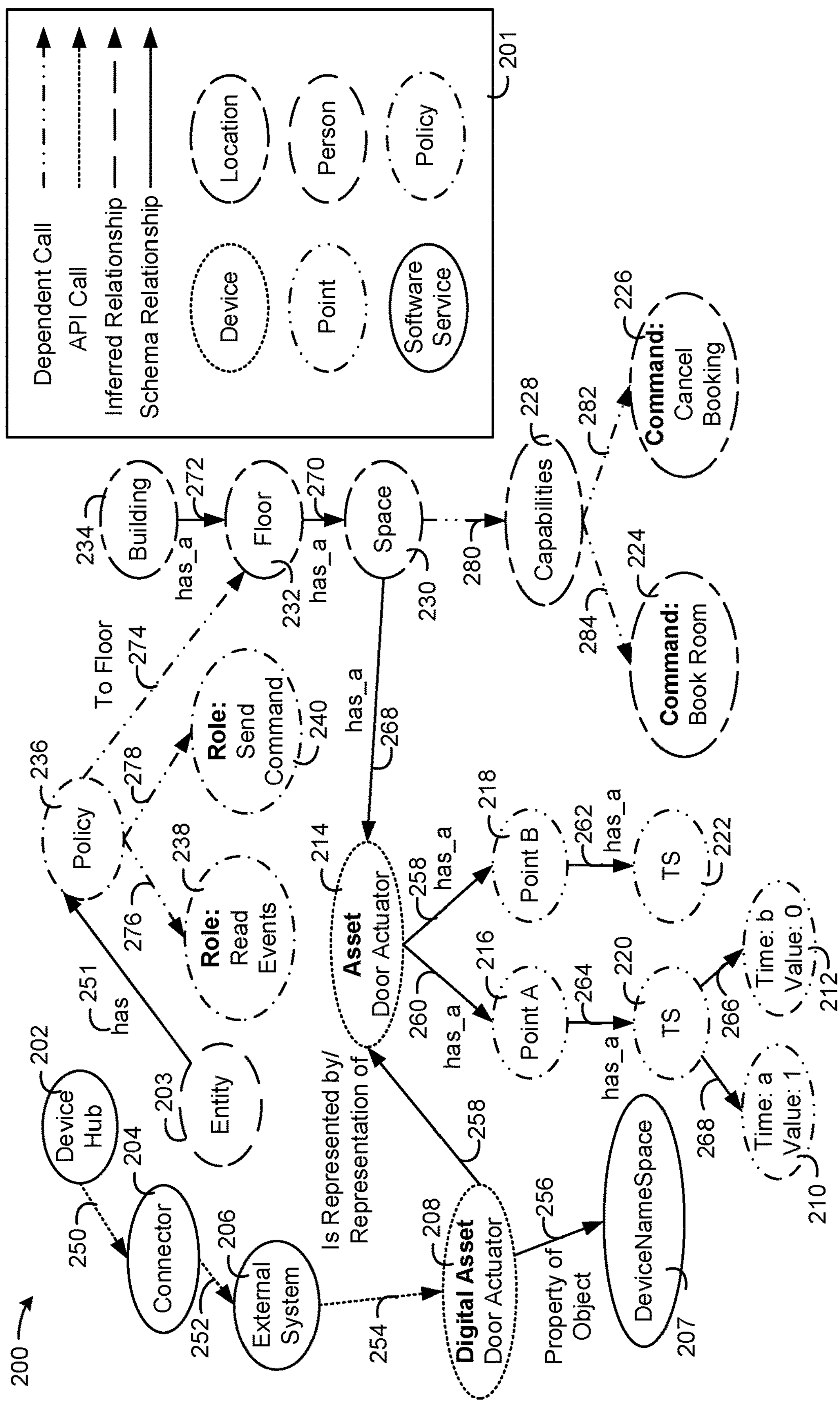
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
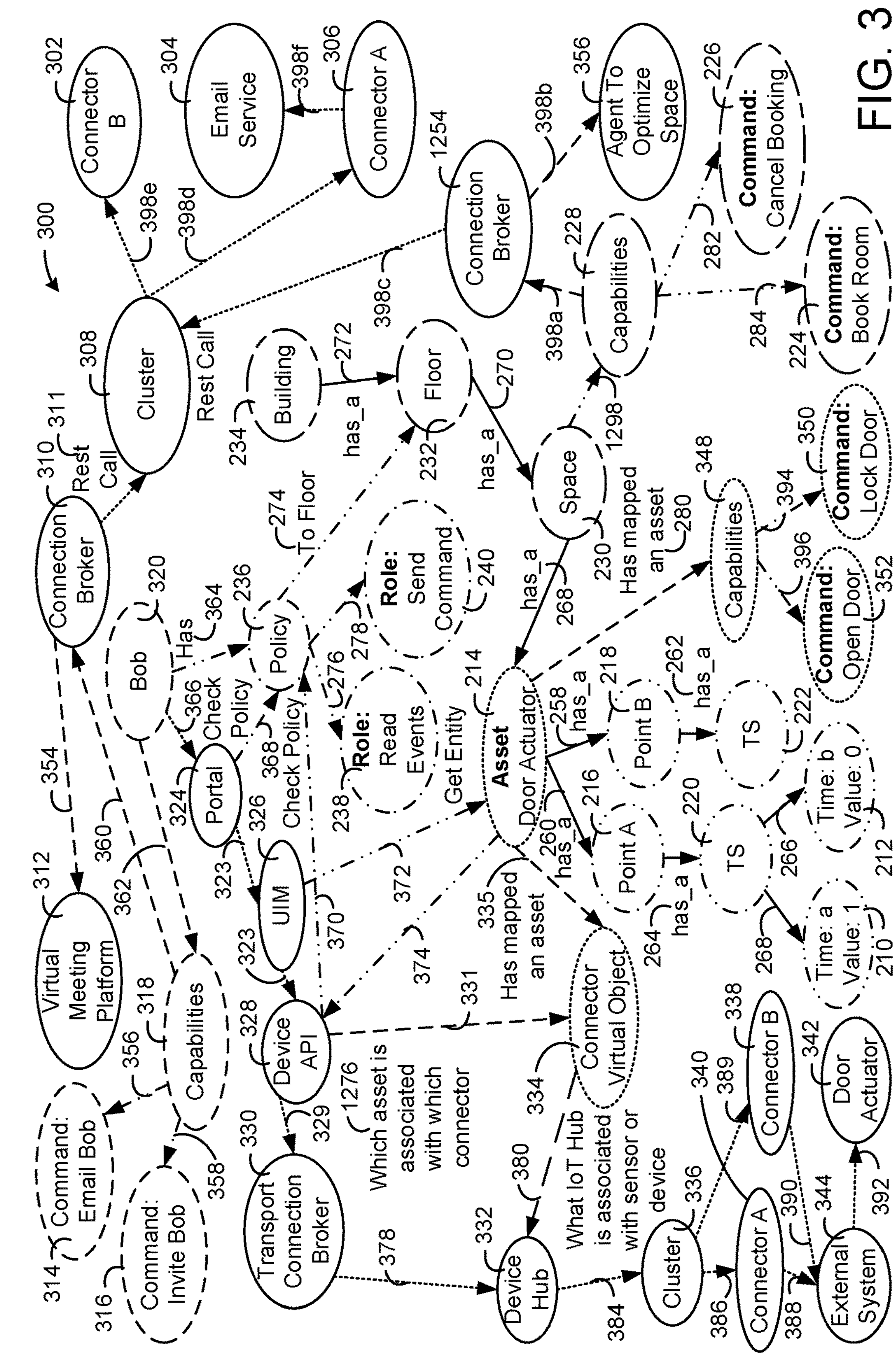
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 354 related to capabilities 228 by edge 398*a*. The connection broker 354 can be a node representing a software application configured to facilitate a connection with another software application. In some embodiments, the cloud platform 106 can identify the system that implements the capabilities 228 by identifying the edge 398*a* between the capabilities 228 and the connection broker 354.

The connection broker 354 is related to an agent that optimizes a space 356 via edge 398*b*. The agent represented by the node 356 can book and cancel bookings for the space represented by the node 230 based on the edge 398*b* between the connection broker 354 and the node 356 and the edge 398*a* between the capabilities 228 and the connection broker 354.

The connection broker 354 is related to a cluster 308 by edge 398*c*. Cluster 308 is related to connector B 302 via edge 398*e* and connector A 306 via edge 398*d*. The connector A 306 is related to an external subscription service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398*f* Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 308 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
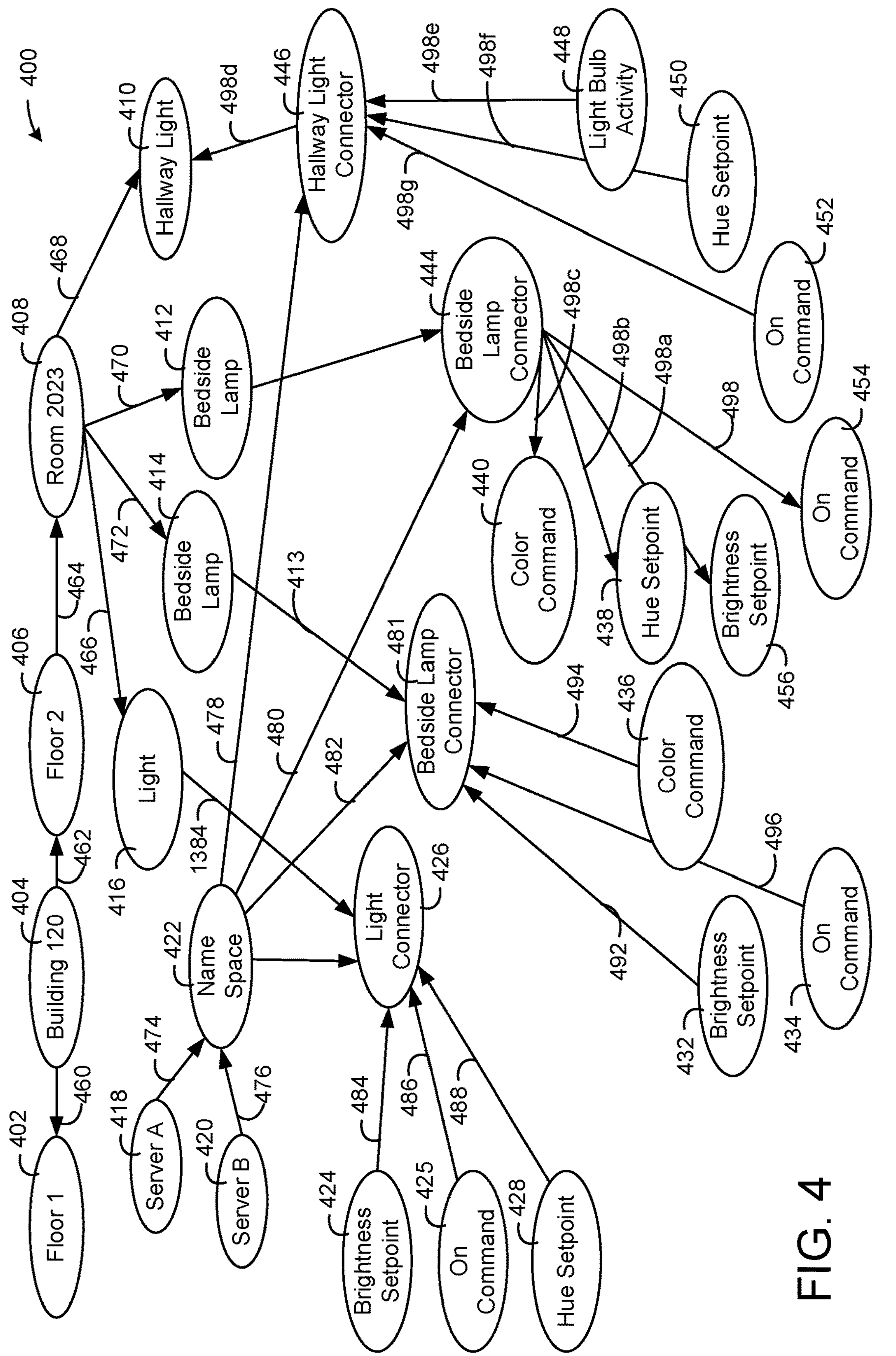
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges **360-498*f*. The cloud platform 106 can search the graph projection 400** to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge **498*d*. The hallway light connector 446 is linked to multiple commands for the hallway light node 410 via edges 498*g*, 498*f*, and 498*e*. The commands are represented by an on command node 452, a hue setpoint node 450, and a light bulb activity node 448**.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges **498*c*, 498*b*, 498*a*, and 498**.

Figure 5:
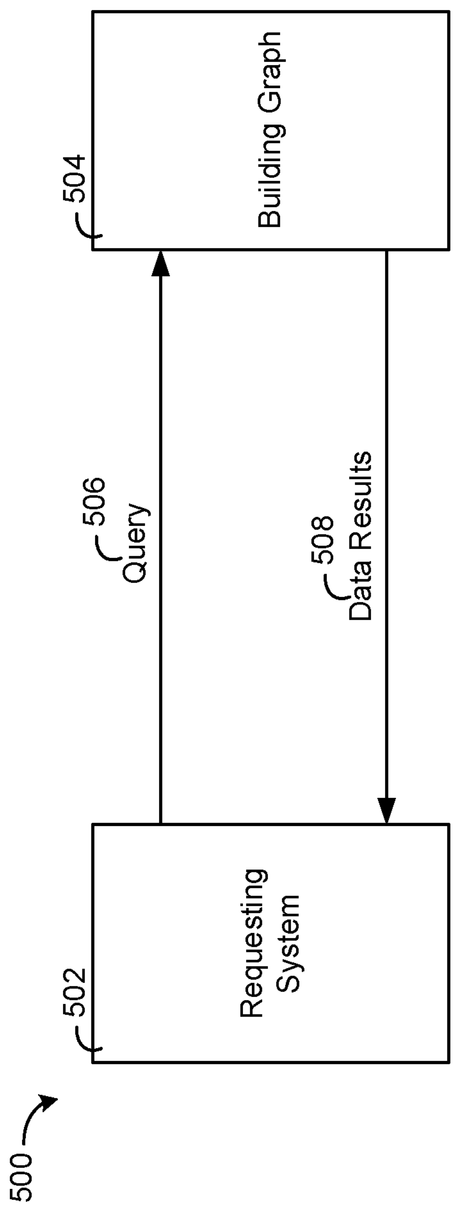
FIG. 5 is a block diagram of a requesting system querying information from a graph data structure and receiving data results, according to an exemplary embodiment.

Referring now to FIG. 5, a block diagram of a system 500 including a requesting system 502 querying information from a building graph 504 and receiving data results is shown, according to an exemplary embodiment. The building graph 504 can be a graph including nodes and edges describing a building and systems of the building, e.g., as shown with reference to FIGS. 2-4. The building graph 504 can be a graph projection of the graph projection database 162.

The requesting system 502 can be the user device 176, the applications 110, and/or any other system or software component. The requesting system 502 can provide a query 506 to the building graph 504 to query the building graph 504 based on one or more parameters of the query 506. The query 506 can be a Graph Query Language (GQL) query, a SPARQL query (SquishQl, RDQL, TriQL), etc.

The building graph 504, or a managing system, can return data results 508 based on the parameters of the query 506. For example, if the query 506 requests identification of all thermostats on a floor of a building, the data results 508 can include an indication of each thermostat on the floor of the building. Similarly, if the query 506 requests identification of users that have access to a conference room, the data results 508 can return identification of the users that have access to the conference room.

Figure 6:
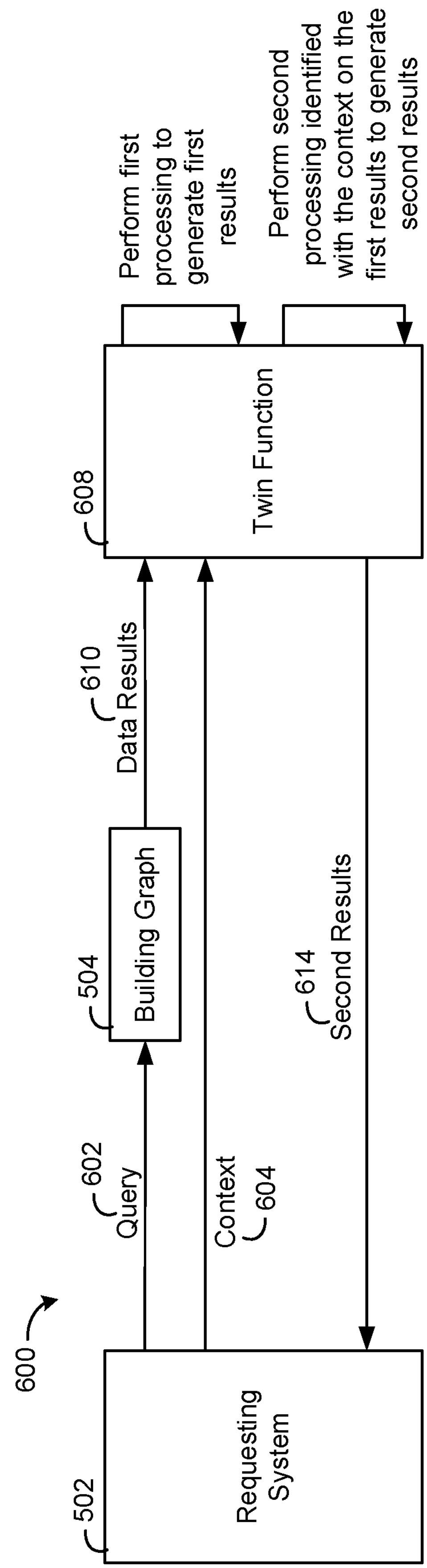
FIG. 6 is a block diagram of the requesting system of FIG. 5 querying the graph data structure of FIG. 5 with a query that includes context and a twin function running on data results of the query, according to an exemplary embodiment.

Referring now to FIG. 6, a system 600 including the requesting system 502 querying the graph data structure 504 with a query 602 that includes context 604 and an twin function 608 that runs on data results of the query is shown, according to an exemplary embodiment. The requesting system 502 can provide a query 602 which includes the context 604. In some embodiments, the query 602 includes query parameters and additionally the context 604.

The query parameters of the query 602 can run against the building graph 504 to generate data results 610, identifications of information or records of the building graph 504. The data results 610 can be input into an twin function 608. In some embodiments, the context 604 identifies an event processor of a group of event processors that apply a particular set of operations. In some embodiments, the context 604 is input into the twin function 608 and defines and/or modifies one or more operations for the twin function 608 to perform. The result of the processing performed by the twin function 608 can be second results 614.

In some embodiments, the twin function 608 can perform one or more steps of processing. For example, the twin function 608 can be configured to perform one or more first processing operations that generate first results based on the data results 610. Furthermore, the twin function 608 can perform second processing identified by the context 604. The second processing can generate second results returned to the requesting system 502, the second results 614.

In some embodiments, the twin function 608 (e.g., operations of a twin function) can be defined by a user, e.g., via the user device 176. The twin function 608, when instantiated and run, or any other twin function associated with a user or subscription, can be tracked. The twin function manager 167 can track usage of the twins, e.g., utilization, time to compute, size or scale of computations, etc. The twin function manage 167 can bill users or entities based on the computing usage of their twin functions.

Figure 7:
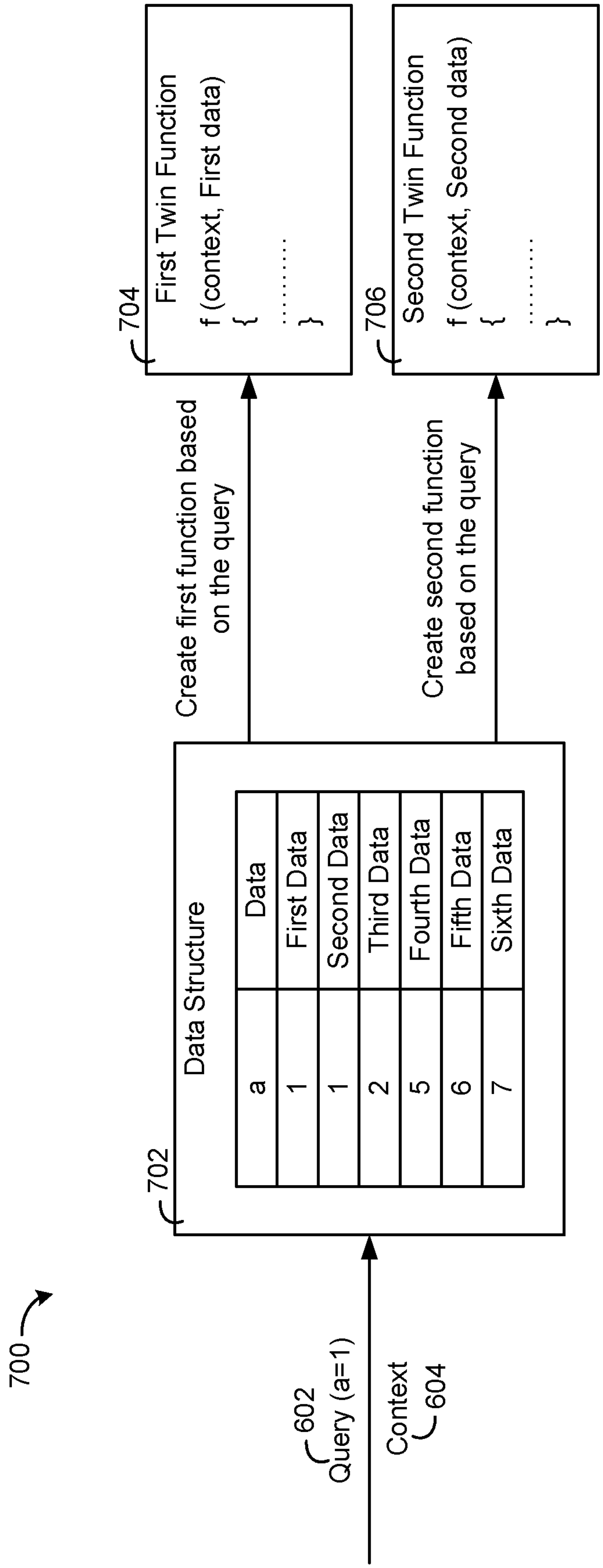
FIG. 7 is a block diagram of a query that includes a parameter identifying data and contextual information for running functions, according to an exemplary embodiment.

Referring now to FIG. 7, a system 700 where the query 602 that includes a parameter identifying data and the context 604 for running functions is shown, according to an exemplary embodiment. The query 602 includes a parameter identify a type of data to return. In the system 700, the query 602 can return first data and second data of a data structure 702 (e.g., the building graph 504). For example, the query 602 could be a query to identify all thermostats and identification of all thermostats stored in the data structure 702 can be returned.

The context 604 can indicate that processing should be performed for each data result. In this regard, a first twin function 704 and a second twin function 706 can be generated. The first twin function 704 can be generated to process the first data returned from the data structure 702 while the second twin function 706 can be generated to process the second data returned from the data structure 702. For example, the query 602 could be a request for all thermostats on a particular floor. The context could be an indication that improved occupant comfort is desired. The first twin function 704 could perform operations to determine a setpoint that is comfortable for occupants for a first thermostat while the second twin function 706 could perform operations to determine a setpoint that is comfortable for occupants for a second thermostat.

The first twin function 704 can execute based on the first data. In some embodiments, the context 604 can define the operations that the first twin function 704 applies to the first data. Similarly, the context 604 can define the operations that the second twin function 706 performs. In some embodiments, the first twin function 704 and the second twin function 706 are selected based on the context 604. In some embodiments, one or more parameters of the first twin function 704 and the second twin function 706 are configured based on the context 604.

Referring now to FIG. 8, a code snippet 800 of a query that includes query parameters and context is shown, according to an exemplary embodiment. The query can include parameters that identify information in the building graph 504. For example, an identification of thermostats on a floor, an identification of equipment with a particular telemetry data event, etc. Furthermore, the query can indicate what processing should be applied for the result data that results from the query data. For example, the context could identify processing should be performed to make a setpoint more comfortable, more energy efficient, be a value to meet a demand response event, etc.

Referring now to FIG. 9, a code snippet 900 of a function that operates based on a context and a record is shown, according to an exemplary embodiment. The function receives context and a record as input. The record may be a result of query parameters of a query such as shown in the code snippet 800. The context can be contextual information specified in the query identifying what processing should be performed based on the input record.

Figure 10:
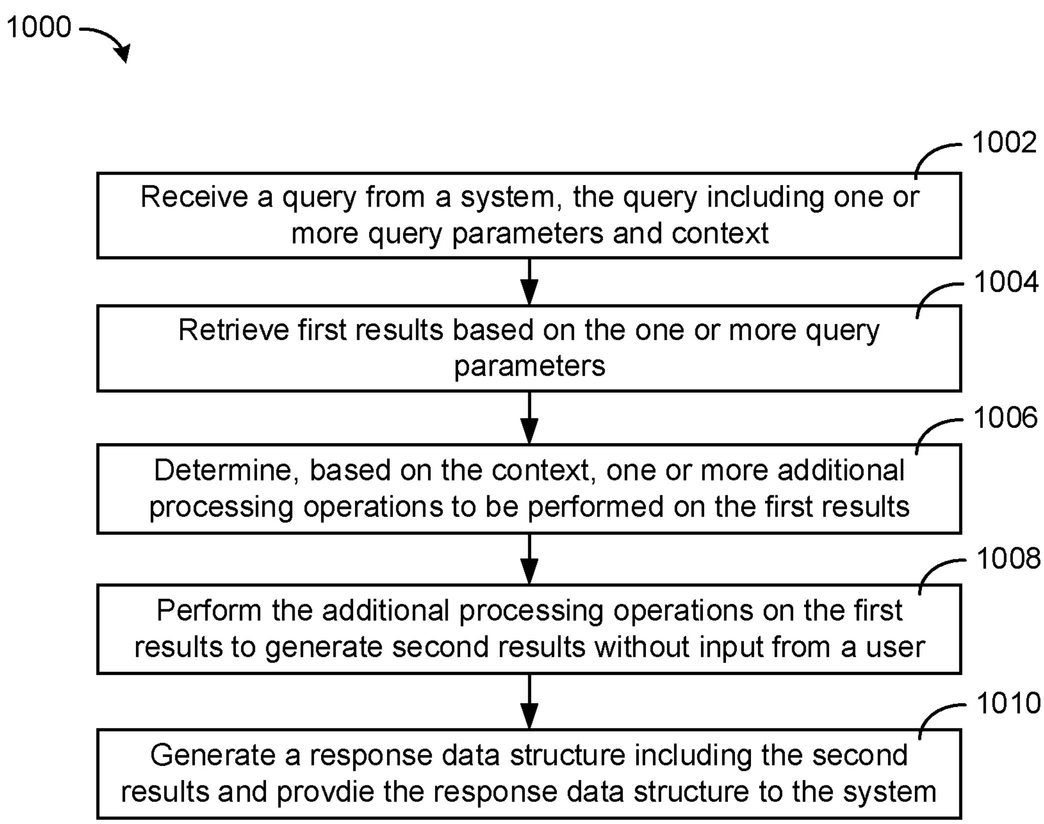
FIG. 10 is a flow diagram of a process of executing one or more functions for a query that uses query parameters and query context, according to an exemplary embodiment.

Referring now to FIG. 10, a flow diagram of a process 1000 of executing one or more functions for a query that defines query parameters and query context is shown, according to an exemplary embodiment. In some embodiments, the building data platform 100 is configured to perform the process 1000. For example, the twin manager 108 and/or the cloud platform 106 can be configured to perform the process 1000. In some embodiments, the query manager 165 is configured to perform the process 1000.

In step 1002, the building data platform 100 receives a query from a system. The system may be the requesting system 502, in some implementations. The query may include one or more query parameters and context. The query parameters can indicate information that should be retrieved from the building graph 504 by the building data platform 100. For example, the query parameters can define a semantic question. Nodes or edges of the building graph 504 that fulfill the semantic question can be returned by the building data platform 100. The query parameters can identify targets for processing. For example, the query parameters could identify all controllers that control air handler units (AHUs). The context can identify processing to perform based on the results. For example, the context could indicate a numerical increase to air change in a building. The processing could identify operating settings for the controllers that increase air changes in the building. The context can describe a purpose of the query, e.g., one or more reasons why the query was provided, e.g., to improve air quality, to reduce energy load, to increase occupancy comfort, etc. Processing results such as improved air quality setpoints, lower energy utilization settings, setpoints that increase occupancy comfort may all meet requirements of the reasons.

In step 1004, the building data platform 100 retrieves first results based on the one or more query parameters. The building data platform 100 can execute the query against the building graph 504 to identify the first results. The first results can be retrieved from the building graph 504 based on the query parameters of the query.

In step 1006, the building data platform 100 can identify one or more additional processing operations to be performed on the first results of the step 1004. For example, the building data platform 100 can configure a function based on the context, e.g., configure one or more parameters of the function to perform one or more operations. Furthermore, in some embodiments, the function itself can be selected by the building data platform 100 based on the context. In some embodiments, the query of the step 1002 includes an identification of a function and the context indicates a particular configuration of the context.

In step 1008, the building data platform 100 performs additional processing operations on the first results to generate second results. The building data platform 100 can generate the second results without requiring any additional input from a user. For example, the first results do not need to be reviewed before the building data platform 100 performs the processing on the first results to generate the second results. Furthermore, the user does not need to specify the processing operations to perform on the first results to generate the second results. The user does not need to perform any work, e.g., identify the processing, trigger the processing, etc., outside of defining the query in the step 1002, to generate the second results.

The additional processing can be identified based on the context. The additional processing can be identified that generates a result that fulfills a requirement of the context, e.g., fulfills a reason why the query of the step 1002 was provided. For example, if the first results are indications of thermostats and thermostat setpoints and the context is an indication to improve occupant comfort, the additional processing operations can be identified that generate occupancy comfortable setpoints, a processing result that meets the reason why the query was provided.

In step 1010, the building data platform 100 can generate a response data structure and provide the response data structure to the system of step 1002. For example, a data package including the second results, the first results, the query parameters, and/or the context can be provided to the system. In some embodiments, the system can perform operations, e.g., implementing settings for the building subsystems 122 based on the second results. For example, a new setpoint for controlling temperature, a lighting level, an airflow level, etc. could be implemented at the building subsystems 122.

Referring now to FIG. 11, a flow diagram of a process 1100 of managing twin functions that execute based on a context, events, and rules is shown, according to an exemplary embodiment. FIG. 11 includes the building subsystems 122, the edge platform 102, the cloud platform 106, the twin manager 108, and the twin function manager 167 described with reference to FIG. 1. Furthermore, FIG. 11 includes contextualized event streams 1102 which may be contextualized (e.g., enriched) event feeds generated by the enrichment manager 138 as described with reference to FIG. 1. Furthermore, FIG. 11 includes an interface manager 1106 for providing an interaction with users or other systems, e.g., the user device 176, the building subsystems 122, the twin manager 108, the cloud platform 106, the applications 110, etc.

In step 1108 of the process 1100, the twin manager 108 can define twin functions. The twin functions can be predefined, preset, or adjustable functions that perform some operation or set of operations. The twin functions can perform one or more operations against data of the building graph 504. The twin functions can receive context, events, and rules as inputs into the twin functions. The events can be the data that the twin function executes against. The context can indicate a described output of the twin function, e.g., a desired form of processing. The rules can identify runtime configuration of the twin function, e.g. define how the twin functions will scale up, down, and/or out.

The twin function can be a user defined function, in some implementations. The twin function can be a function that translates between units, e.g., from degrees Fahrenheit to degrees Celsius. The twin function could take a data point in degrees Fahrenheit and generate a corresponding data point in degrees Celsius. In some embodiments, the twin function can be configured to generate a virtual point. For example, two meters can measure physical data for physical data points. The twin function can generate a virtual data point combining (e.g., adding, averaging, multiplying, applying a function, etc.) the data points together. The twin function can, in some implementations, simulate an output of a control decision. For example, if a user wishes to increase an airflow by 10%, the twin function can return settings that would implement the airflow and indicate energy usage resulting from the change. In some embodiments, the output of the twin function can be fed back into the twin function, or another twin function, to derive further higher level results.

In step 1110, a user can select a twin function to execute for some particular context via the interface manager 1106, e.g., via the user device 176. For example, a user could provide context that they want to calculate occupancy for a zone (e.g., the context) with a zone occupancy function (e.g., identification of the twin function). In step 1112, the twin manager 108 can set twin function scaling to spin up a twin function based on the selected twin function of the step 1110.

In step 1114, the twin function manager 167 determines a context query. The context query can be a query that retrieves some context from the building graph 504 and determines whether an action has occurred. For example, the context query could query occupancy sensors of a floor of a building to determine whether measured data for the occupancy sensors has changed. The context query can be generated based on the context. For example, if the context indicates that a user would like to view occupancy for a floor, the twin function manager 167 can identify that the twin function manager 167 should monitor occupancy sensors for the floor specified by the user. In this regard, the twin function manager 167 can analyze the building graph 504 with the context to derive the context query.

In step 1116, the twin function manager 167 can generate an operation to watch the building graph 504 with the context query. The operation can be configured to trigger execution of the selected twin function of the step 1110 when the context query is triggered. In steps 1120-1124, the building data platform 100 receives a location data event. In some embodiments, the operation of the step 1116 monitors occupancy sensors of a particular geographic area. Responsive to detecting the location data event, an event within the particular geographic area, the operation triggers a twin function 1118 to spin up. In some embodiments, before the location data event is processed, the event is normalized and/or enriched with geographic area information in step 1125 before being forwarded to the twin function 1118 in step 1128. The twin function 1118 can be the same as, or similar to, the twin functions described with reference to FIGS. 5-10, e.g., the twin function 608, the first twin function 704, and/or the second twin function 706.

In some embodiments, the twin function 1118 can query the building graph 504 for contextual information. The query can be based on the context input into the twin function 1118, e.g., defined based on the context received in the step 1110. The query can return information such as a geofence, in step 1129. The twin function can compare the location event to the geofence to determine whether the zone defined by the geofence is occupied or unoccupied. In step 1130, the twin function 1118 can write a zone occupied status back into the building graph 504. Furthermore, aggregate room occupancies for a building, including the status determine by the twin function 1118, can be collected in step 1134 and returned as a high level output for a user in steps 1132, 1134, and 1136.

Referring now to FIG. 12, the twin function manager 167 monitoring the building graph 504 and generating twin functions responsive to detecting an event in the building graph 504 is shown, according to an exemplary embodiment. The twin function manager 167 includes a monitor operation 1202 including a context query 1204. The context query 1204 can be built based on context received from a system, e.g., defined by a user. The context query 1204 can query the graph for information to determine whether a processing result of a twin function, when executed with a context, is affected by information added to the graph. Responsive to identifying, with the context query 1204, that information has been added to the graph that affects the processing result, the twin function manager 167 can execute the twin functions with the context to generate new values for the processing result.

The monitor operation 1202 can be set to watch occupancy changes in a floor 1 geofence and/or in a conference room of floor 1. In this regard, responsive to a new occupancy event being added to the building graph 504 by an occupancy sensor 1201 (e.g., a Bluetooth low energy badge, a Wi-Fi tracking system, a passive infrared sensor (PIR) sensor, etc.), the monitor operation 1202 can trigger the twin function generator 12006 to spin up twin functions to operate based on the occupancy event.

The building graph 504 can include nodes 1224-1238. The building graph 504 further includes edges 1242-1256 between the nodes 1224-1238. A node floor 1 1224 is related to a cafeteria node 1230 via an edge 1244 "isLocatedOn." The node floor 1 1224 is related to a conference room node 1240 via an edge 1246 "isLocatedOn." The node floor 1 1224 is related to a geofence 1238 via an edge 1242 "isLocatedOn." The geofence node 1238 is related to an occupied status node 1238 via an edge 1252 "hasA." A geofence node 1232 is related to a conference room node 1240 via an edge 1250 "includes." A geofence node 1228 is related to a cafeteria node 1230 via an edge 1256 "includes." The geofence node 1228 is further related to an occupied status node 1234 via an edge 1254 "hasA."

Responsive to the context query 1204 being triggered, the twin function generator 1206 can spin up, e.g., generate, create, instantiate a twin function 1208 and a twin function 1210. The addition of the occupancy event node 1226 to the building graph 504 and the edge 1248 between the cafeteria node 1230 and the occupancy event node 1226 can trigger twin function generator 1206 to spin up the twin function 1208 and the twin function 1210.

The twin function 1208 can execute for a geofence of the cafeteria and can include context regarding tracking occupancy for geofences of a floor 1. Nodes or edges indicate that the cafeteria is included within a particular geofence, e.g., the node geofence 1228, the cafeteria node 1230, and the edge 1256 indicating that the geofence includes the cafeteria. Furthermore, the geofence 1228 "hasA" edge 1254 occupied status node 1234. The context 1216 can indicate the node 1228, the edge 1254, and the occupied status 1234. In this regard, the context 1216 can define the geofence and what node should be updated with the processing result of the twin function 1208.

The twin function 1208 can analyze the occupancy event 1212 to determine that the occupancy event is an event that falls within the cafeteria geofence based on the context 1216. Runtime parameters can be defined by the rules 1214. The rules 1214 can define how the twin function 1208 scales out and/or scales up as needed. The twin function 1208 can write an occupied status output to the occupied status node 1234.

Similarly, the twin function 1210 can include the occupancy event 1212, rules 1220, and context regarding a floor 1 geofence 1238. The twin function 1210 can process the occupancy event 1212 based on the rules 1220 and/or the context 1222. The resulting occupied status output of the twin function 1210 can be written to the occupied status 1236.

The twin function 1210 can run as an instance to track occupancy for the geofence node 1238 while the twin function 1208 can run as an instance to track occupancy for the geofence 1228. The context 1216 and 1222 can indicate the purpose of the request to run the twin functions, e.g., to track occupancy. Furthermore, the context 1216 and 1222 can indicate the targets to run the twin functions 1208 and 1210 for, e.g., the geofence node 1238 and the geofence node 1228. In this regard, the twin function manager 167 could analyze received context to determine what processing result a user or system wishes to determine with the twin functions 1208 and 1210 and further what instances, and how many instances of the twin function 1208 and 1210 should run.

For example, the twin function manager 167 could analyze the building graph 504 based on the context to determine which geofences are geofences of the "Floor 1." The twin function manager 167 can traverses the nodes and edges of the building graph 504 to identify the geofences of the Floor 1 and cause the twin functions to run for each of the identified geofences. Because the context describes the processing requirements and reasons for the request in terms of the building graph 504, the number of twin functions that run can scale automatically, e.g., as new geofences are added to the building graph 504 for the Floor 1, corresponding twin functions can be created and run by the twin function manager 167 as appropriate.

Referring now to FIG. 13, a system 1300 including a server 1302 scaling up to accommodate processing requirements for a twin function is shown, according to an exemplary embodiment. The server 1302 includes processors 1304 and memory 1306. The processors 1304 and the memory 1306 can be computing resources of a larger computing system allocated to the server 1302. The allocated processors 1304 and memory 1306 can be allocated from processor devices and memory devices such as processors and memories discussed with reference to FIG. 1.

The server 1302, which can be a virtual computing system, can process a twin function 1308 which may be a function as described with reference to FIGS. 5-12. The server 1302 can spin up to run the twin function 1308 when a monitoring operation triggers the twin function 1308 to execute. While the twin function 1308 is executing, the server 1302 may identify that additional processing and/or memory resources are available and/or are necessary to execute the twin function 1308. In this regard, the server 1302 can be configured to scale up, requesting that a managing system allocate additional processors 1310 and memories 1312.

Figure 14:
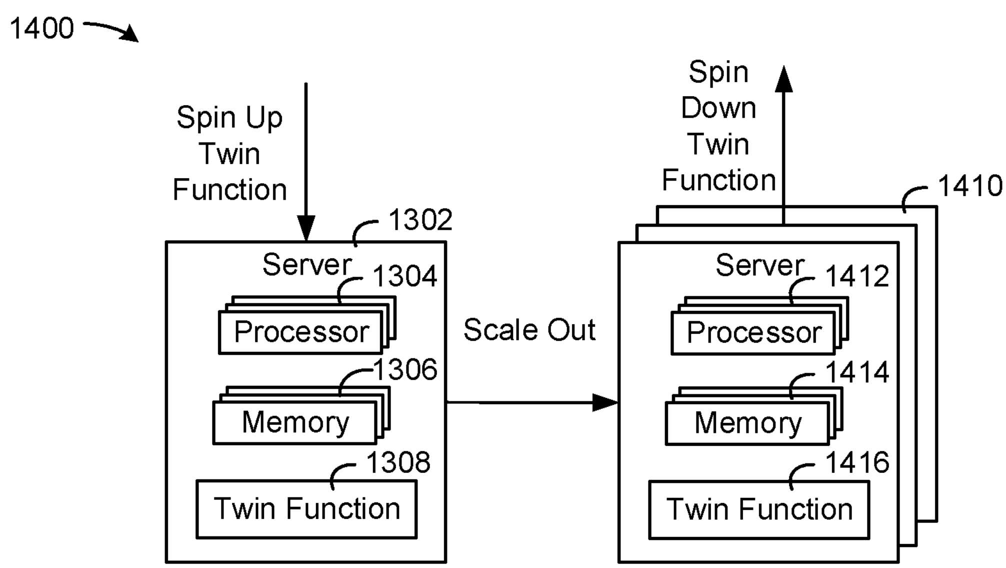
FIG. 14 is a block diagram of a server scaling out to accommodate multiple twin functions, according to an exemplary embodiment.

Referring now to FIG. 14, a system 1400 including the server 1302 scaling out to accommodate multiple twin functions is shown, according to an exemplary embodiment. In some embodiments, instead of determining that the twin function 1308 requires additional processing or memory resources, the system 1400 may identify that multiple instances of the twin function 1308 need to run. In some embodiments, the system 1400 can implement multiple instances 1410 of the server 1302 with allocation of processors 1412 to each of the servers 1410 and allocation of memory 1414 to each of the servers 1410. Furthermore, each of the servers 1410 can include an instance 1416 of the twin function 1308 twin function 1316.

Figure 15:
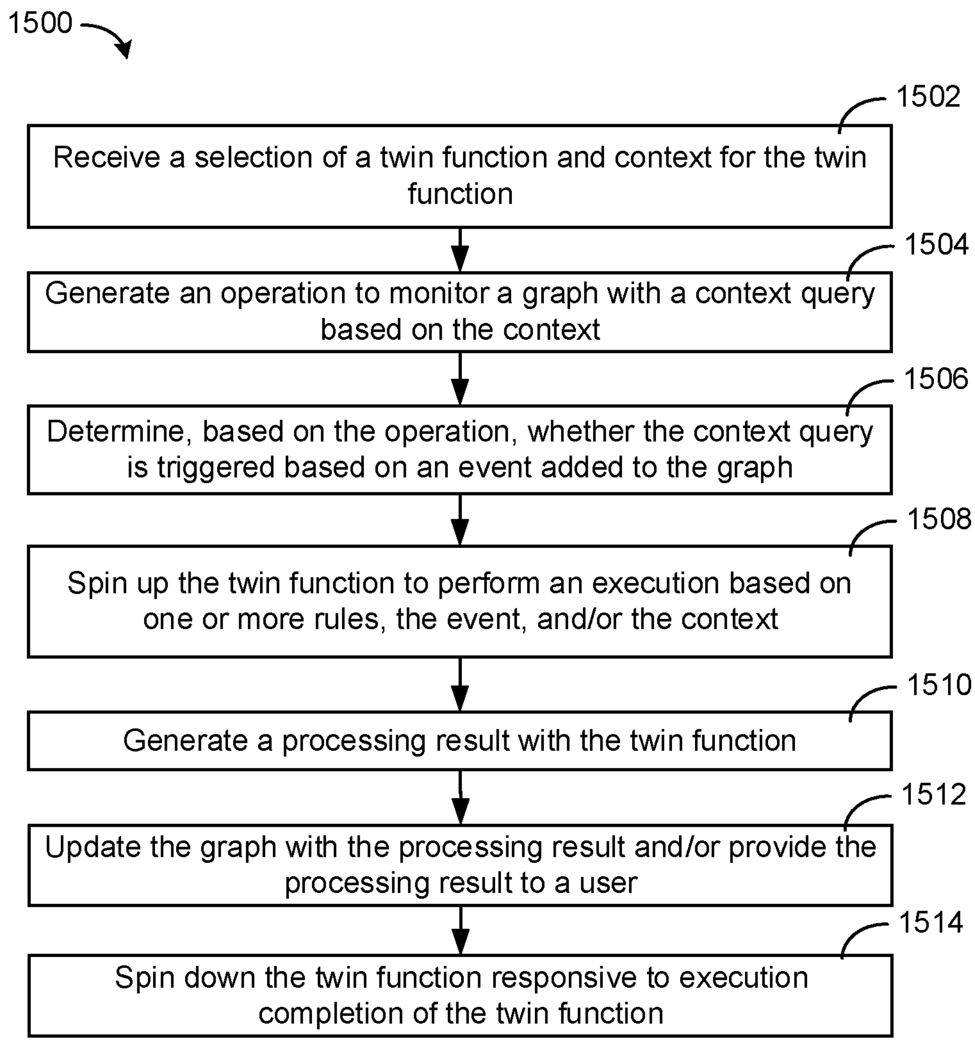
FIG. 15 is a flow diagram of a process of managing twin functions that execute based on a context, events, and rules, according to an exemplary embodiment.

Referring now to FIG. 15, a flow diagram of a process 1500 of managing twin functions that execute based on a context, events, and rules is shown, according to an exemplary embodiment. In some embodiments, the building data platform 100, the applications 110, the cloud platform 106, the edge platform 102, and/or the twin manager 108 can perform the process 1500. In some embodiments, the twin function manager 167 is configured to perform the process 1500.

In step 1502, the building data platform 100 receives a selection of a twin function and context for the twin function. In some embodiments, a user or piece of software selects a twin function from a set of twin functions supported by the building data platform 100. Furthermore, the context can indicate the processing context for the twin function, e.g., what the user or piece of software wants to accomplish with the processing. For example, the context can be an indication to calculate occupancy for a particular zone, improve energy usage in a particular building, improve temperatures setpoints to more occupant comfortable setpoints, etc.

In step 1504, the building data platform 100 generates an operation to monitor a graph with a context query, the context query based on the context. The context query could monitor status changes of occupancy sensor data stored in the graph if the context indicates that the user wishes to calculate occupancy levels of a particular floor of a building where the occupancy sensors are included. The graph monitored by the query may be the building graph 504.

In step 1506, the building data platform 100 can determine, based on the operation generated in the step 1504, whether the context query is triggered based on a new event added into the graph. For example, if the context query searches for temperature measurements of conference rooms on a particular floor exceeding a particular level, the operation can trigger and spin up a twin function for each conference room where the temperature has exceeded the level.

In step 1508, the building data platform 100 can spin up the twin function selected in the step 1502. The twin function can be executed based on one or more rules (e.g., runtime configurations), the event added to the graph in the step 1506, and the context received in the step 1502. The result of executing the twin function can be generating a processing result with the twin function with the one or more rules, the event, and the context in the step 1510.

In step 1512, the building data platform 100 can update the graph with the processing result and/or provide the processing result to an end user or system, e.g., via the user device 176 and/or the applications 110. In some embodiments, the context received in the step 1502 can indicate what nodes or edges to add and/or edit in the graph. Furthermore, responsive to completing the processing of the result with the twin function, the twin function can spin down (e.g. deallocate), freeing up computing resources to run other twin functions, in step 1514.

Figure 16:
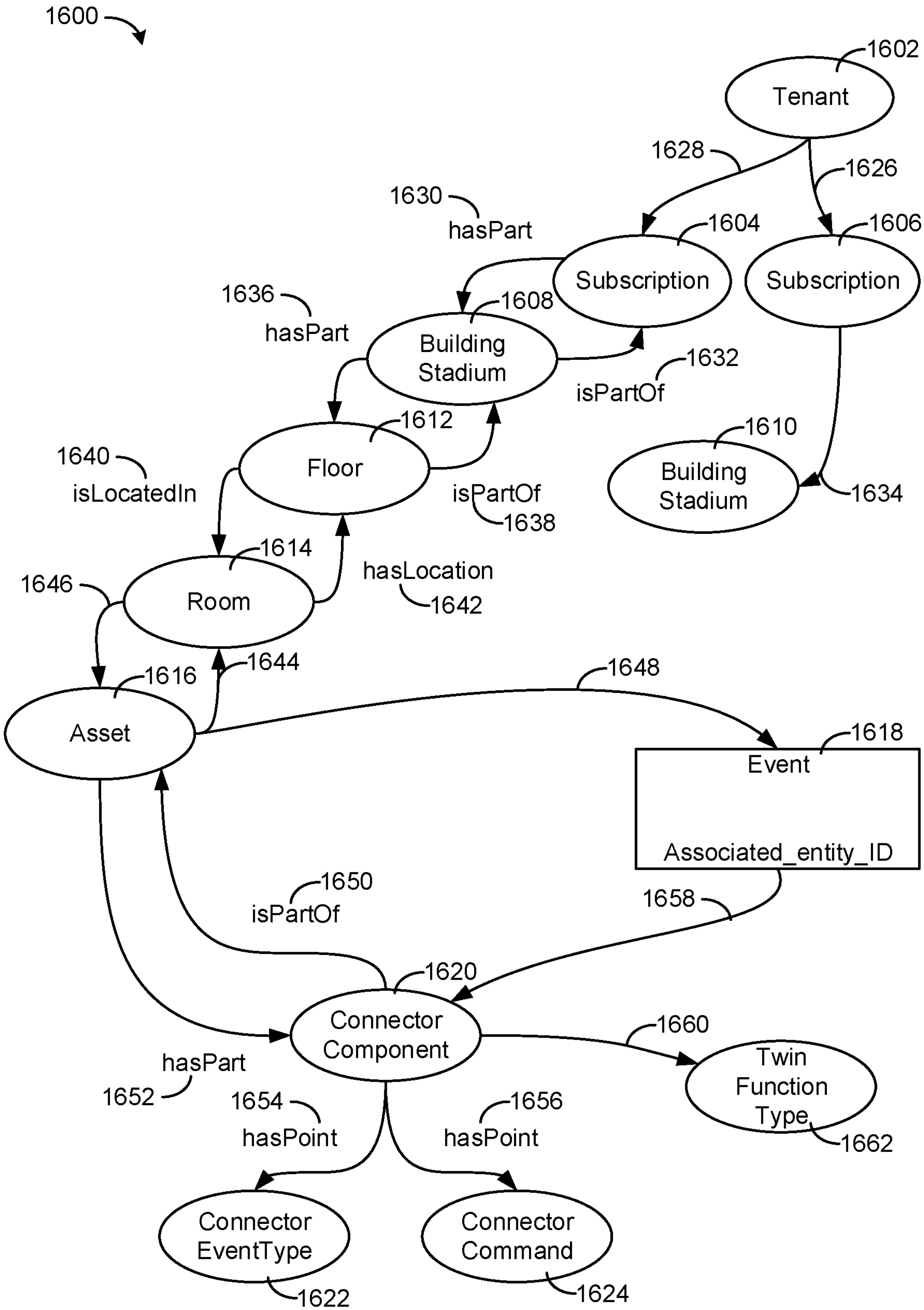
FIG. 16 is a graph including nodes and edges where one node represents an event associated with a twin function type, according to an exemplary embodiment.

Referring now to FIG. 16, a graph 1600 including nodes and edges where one node, event 1618, represents an event associated with a twin function type is shown, according to an exemplary embodiment. The nodes 1602-1624 and node 1662 of the graph 1600 are interconnected by the edges 1626-1658 and edge 1660. In some embodiments, the twin function manager 167 can operate against the graph 1600 to spin up twin functions, e.g., responsive to receiving a specific event and/or a state of an asset, space, person, device, etc. changing.

In the graph 1600 includes a tenant 1602. The tenant 1602 may represent an entity (e.g., user, company, etc.) that has a contract or agreement to use processing resources of the system 100. The tenant 1602 includes two subscriptions, subscription 1604 and subscription 1606. The tenant 1602 is related to the subscription 1604 via edge 1628. The tenant 1602 is related to the subscription 1606 via the edge 1626. The tenant 1602 may be the owner of various stadiums, e.g., two stadiums. The subscription 1604 may be for a building stadium 1608. The subscription 1604 is related to the building stadium 1608 via the "hasPart" edge 1630. The building stadium 1608 is related to the subscription 1604 via the edge "isPartOf" 1632. The subscription 1606 can be for another building stadium, building stadium 1610. The subscription 1606 is related to the building stadium 1610 via an edge 1634.

The building stadium 1608 is related to the floor 1612. The building stadium 1608 is related to the floor 1612 via the "hasPart" edge 1636. The floor 1612 is related to the building stadium 1608 via the "isPartOf" edge 1638. The floor 1612 is related to the room 1614 via an "isLocatedIn" edge 1640. The room 1614 is related to the floor 1612 via the "hasLocation" edge 1642. The room 1614 is related to an asset 1616 via an edge 1646 while the asset 1616 is related to the room 1614 via an edge 1644.

The asset 1616 includes an event, the event 1618. The asset is related to the event 1618 via the edge 1648. The asset 1616 is related to the connector component 1620 via a "hasPart" edge 1652. The connector component 1620 is related to the asset 1616 via an "isPartOf" edge 1650. The connector component 1620 is related to the connector eventType 1622 via a "hasPoint" edge 1654 and is related to the connector command 1624 via a "hasPoint" edge 1656.

In some embodiments, responsive to the event 1618 being received and added to the building graph 1600, a twin function of a specific type can run and execute based at least in part on the event 1618. In some embodiments, the connector component 1620 can represent a stream of events where the event 1618 is one event of the stream. The twin manager 108 can generate the connector component 1620 to represent the event stream, e.g., telemetry of the asset 1616. Additional events can be added to the building graph 1600 of the event stream and related via an edge to the connector component 1620. The event stream can be a virtual event stream generated based on other events. The connector component 1620 can represent a derived point for the virtual event stream. The event 1618 can include an identifier, "Associated_entity_ID" which may identify the asset, e.g., asset 1616, that the event 1618 is associated with.

The connector 1620 is related to a twin function type 1662 via an edge 1660. The twin function type 1662 can indicate a specific type of twin function that should execute based on the reception of the event 1618 and/or an event of the event stream with a particular event value. Furthermore, in some embodiments, the event 1618 can be an event generated by a twin function of the twin function of the twin function type 1662. The event 1618 can be added to the graph 1600 based on the twin function type 1662.

In some embodiments, the event 1618 represents a state of the asset 1616. Responsive to receiving the event 1618, a state of the asset 1616 can change, e.g., by the presence of the event 1618 in the graph 1600. In some embodiments, as a new event is received, the new event can be added to the building graph 1600 to replace the existing event 1618. In some embodiments, a twin function can execute responsive to a certain state of an asset changing in a particular manner.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building system of a building comprising one or more memory devices having instructions stored thereon, that, when executed by one or more processors, cause the one or more processors to:
- receive a selection including a context and a twin function, the context indicating one or more purposes for the twin function, wherein a processing result is generated by the twin function;
- generate an operation to monitor a building graph based on the context, the operation identifying whether one or more new events are added to the building graph, the one or more new events affecting the processing result;
- cause the twin function to execute responsive to identifying the one or more new events added to the building graph that affect the processing result;
- execute the twin function based on the one or more new events and the context to generate the processing result; and
- add the processing result to the building graph.

2. The building system of claim 1, wherein the context indicates a plurality of targets of the building graph to run the twin function for;
- wherein the instructions cause the one or more processors to:
  - identify the plurality of targets of the building graph by querying the building graph with the context; and
  - execute a plurality of twin functions for each of the plurality of targets responsive to identifying the one or more new events added to the building graph that affect the processing result.

3. The building system of claim 1, wherein the one or more processors receive the context and the selection of the twin function from a user via a user device.

4. The building system of claim 1, wherein the twin function receives the context, the one or more new events, and one or more runtime configuration rules as inputs;
- wherein the twin function generates the processing result as an output.

5. The building system of claim 1, wherein the instructions cause the one or more processors to:
- store a plurality of twin functions in the one or more memory devices, each of the plurality of twin functions including one or more predefined operations, each of the plurality of twin functions including an event input, a context input, and a rule input;
- wherein the selection of the twin function selects the twin function from the plurality of twin functions stored in the one or more memory devices.

6. The building system of claim 1, wherein the instructions cause the one or more processors to:
- generate a context query that queries the building graph to identify the one or more new events that, when added to the building graph, affect the processing result; and
- generate the operation to monitor the building graph by causing the operation to include the context query and execute the context query on the building graph to determine whether the one or more new events have been added to the building graph.

7. The building system of claim 1, wherein the instructions cause the one or more processors to:
- instantiate the twin function by creating a server with allocated processor resources and memory resources to execute the twin function, responsive to determining to execute the twin function; and deallocate the twin function by releasing the allocated processor resources and memory resources responsive to determining that the twin function has finished execution.

8. The building system of claim 7, wherein the instructions cause the one or more processors to:

determine that one or more operations performed by the twin function require additional computational resources; and allocate the additional computational resources to the server to execute and twin function with the additional computational resources.

9. The building system of claim 7, wherein the instructions cause the one or more processors to:

receive an indication to execute multiple instances of the twin function;

scale out the twin function by generating a plurality of servers, one server for each of the multiple instances of the twin function, each of the plurality of servers configured to execute one instance of the multiple instances of the twin function, each of the plurality of servers including allocated processing resources and allocated memory resources; and scale down each of the multiple instances of the twin function by releasing the allocated processing resources and the allocated memory resources of the plurality of servers.

10. A method comprising:

receiving, by a processing circuit, a selection including a context and a twin function, the context indicating one or more purposes for the twin function, wherein a processing result is generated by the twin function;

generating, by the processing circuit, an operation to monitor a building graph based on the context, the operation identifying whether one or more new events are added to the building graph, the one or more new events affecting the processing result;

causing, by the processing circuit, the twin function to execute responsive to identifying the one or more new events added to the building graph that affect the processing result;

executing, by the processing circuit, the twin function based on the one or more new events and the context to generate the processing result; and adding, by the processing circuit, the processing result to the building graph.

11. The method of claim 10, wherein the context indicates a plurality of targets of the building graph to run the twin function for;

further comprising:

identifying, by the processing circuit, the plurality of targets of the building graph by querying the building graph with the context; and executing, by the processing circuit, a plurality of twin functions for each of the plurality of targets responsive to identifying the one or more new events added to the building graph that affect the processing result.

12. The method of claim 10, further comprising receiving, by the processing circuit, the context and the selection of the twin function from a user via a user device.

13. The method of claim 10, wherein the twin function receives the context, the one or more new events, and one or more runtime configuration rules as inputs;

wherein the twin function generates the processing result as an output.

14. The method of claim 10, further comprising:

storing, by the processing circuit, a plurality of twin functions in one or more memory devices, each of the plurality of twin functions including one or more predefined operations, each of the plurality of twin functions including an event input, a context input, and a rule input;

wherein the selection of the twin function selects the twin function from the plurality of twin functions stored in the one or more memory devices.

15. The method of claim 10, further comprising:

generating, by the processing circuit, a context query that queries the building graph to identify the one or more new events that, when added to the building graph, affect the processing result; and generating, by the processing circuit, the operation to monitor the building graph by causing the operation to include the context query and execute the context query on the building graph to determine whether the one or more new events have been added to the building graph.

16. The method of claim 10, further comprising:

instantiate, by the processing circuit, the twin function by creating a server with allocated processor resources and memory resources to execute the twin function, responsive to determining to execute the twin function; and deallocate, by the processing circuit, the twin function by releasing the allocated processor resources and memory resources responsive to determining that the twin function has finished execution.

17. The method of claim 16, further comprising:

determining, by the processing circuit, that one or more operations performed by the twin function require additional computational resources; and allocating, by the processing circuit, the additional computational resources to the server to execute the twin function with the additional computational resources.

18. The method of claim 16, further comprising:

receiving, by the processing circuit, an indication to execute multiple instances of the twin function;

scale out, by the processing circuit, the twin function by generating a plurality of servers, one server for each of the multiple instances of the twin function, each of the plurality of servers configured to execute one instance of the multiple instances of the twin function, each of the plurality of servers including allocated processing resources and allocated memory resources; and deallocate down, by the processing circuit, each of the multiple instances of the twin function by releasing the allocated processing resources and the allocated memory resources of the plurality of servers.

19. A building system of a building comprising:

one or more memory devices having instructions stored thereon; and one or more processors configured to execute the instructions to:

receive a selection including a context and a twin function, the context indicating one or more purposes for the twin function, wherein a processing result is generated by the twin function;

generate an operation to monitor a building graph based on the context, the operation identifying whether one or more new events are added to the building graph, the one or more new events affecting the processing result;

cause the twin function to execute responsive to identifying the one or more new events added to the building graph that affect the processing result;

execute the twin function based on the one or more new events and the context to generate the processing result; and add the processing result to the building graph.

20. The building system of claim 19, wherein the instructions cause the one or more processors to:

generate a context query that queries the building graph to identify the one or more new events that, when added to the building graph, affect the processing result; and generate the operation to monitor the building graph by causing the operation to include the context query and execute the context query on the building graph to determine whether the one or more new events have been added to the building graph.

* * * * *